(12) United States Patent
Hattori et al.

(10) Patent No.: US 10,851,890 B2
(45) Date of Patent: Dec. 1, 2020

(54) CONTROL APPARATUS FOR VEHICLE DRIVE-FORCE TRANSMITTING APPARATUS

(71) Applicant: TOYOTA JIDOSHA KABUSHIKI KAISHA, Toyota (JP)

(72) Inventors: Kunio Hattori, Nagoya (JP); Taichi Washio, Okazaki (JP); Takuro Shimazu, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 4 days.

(21) Appl. No.: 16/374,797

(22) Filed: Apr. 4, 2019

(65) Prior Publication Data

US 2019/0316674 A1 Oct. 17, 2019

(30) Foreign Application Priority Data

Apr. 16, 2018 (JP) ................................ 2018-078763

(51) Int. Cl.
| | |
|---|---|
| *F16H 61/12* | (2010.01) |
| *F16H 37/08* | (2006.01) |
| *F16H 9/18* | (2006.01) |
| *F16H 61/662* | (2006.01) |

(52) U.S. Cl.
CPC .............. *F16H 61/12* (2013.01); *F16H 9/18* (2013.01); *F16H 37/0846* (2013.01); *F16H 61/662* (2013.01); *F16H 2037/0866* (2013.01); *F16H 2061/1232* (2013.01)

(58) Field of Classification Search
None
See application file for complete search history.

(56) References Cited

U.S. PATENT DOCUMENTS

| 5,468,196 A * | 11/1995 | Minowa ................ B60W 10/02 477/107 |
|---|---|---|
| 6,066,070 A * | 5/2000 | Ito ......................... B60W 10/06 477/43 |
| 10,513,181 B2 * | 12/2019 | Omran ................ B60W 30/143 |
| 2017/0016530 A1 * | 1/2017 | Moriyama ............ F16H 61/662 |

FOREIGN PATENT DOCUMENTS

| JP | 5505324 B2 | 5/2014 |
|---|---|---|
| JP | 2017-101745 A | 6/2017 |
| JP | 2017-129192 A | 7/2017 |

* cited by examiner

*Primary Examiner* — Justin Holmes
(74) *Attorney, Agent, or Firm* — Oliff PLC

(57) ABSTRACT

A control apparatus for a vehicle drive-force transmitting apparatus including a gear mechanism and a continuously-variable transmission mechanism and defining first and second drive-force transmitting paths. When the continuously-variable transmission mechanism is in a failure state in which an actual gear ratio of the continuously-variable transmission mechanism is not the highest gear ratio as a target gear ratio, the control apparatus sets the target gear ratio to a transient target gear ratio that is gradually changed toward the highest gear ratio, for causing the actual gear ratio to be gradually changed toward the highest gear ratio. A rate of change of the transient target gear ratio is higher in a state in which a drive force is transmitted through the first drive-force transmitting path by the gear mechanism, than in a state in which the drive force is transmitted through the second drive-force transmitting path by the continuously-variable transmission mechanism.

9 Claims, 11 Drawing Sheets

CONTROL APPARATUS FOR VEHICLE DRIVE-FORCE TRANSMITTING APPARATUS

This application claims priority from Japanese Patent Application No. 2018-078763 filed on Apr. 16, 2018, the disclosure of which is herein incorporated by reference in its entirety.

FIELD OF THE INVENTION

The present invention relates to a control apparatus for a drive-force transmitting apparatus that is to be provided in a vehicle, wherein the drive-force transmitting apparatus has a plurality of drive-force transmitting paths that are provided in parallel with each other between a drive force source and drive wheels of the vehicle.

BACKGROUND OF THE INVENTION

There is known a control apparatus for a drive-force transmitting apparatus that is to be provided in a vehicle having a drive force source and drive wheels, wherein the drive-force transmitting apparatus includes: an input rotary member to which a drive force is to be transmitted from the drive force source; an output rotary member from which the drive force is to be outputted to the drive wheels; a gear mechanism configured to provide at least one gear ratio; a continuously-variable transmission mechanism including a primary pulley, a secondary pulley, and a transfer element that is looped over the primary and secondary pulleys, and configured to provide a variable gear ratio that is lower than the at least one gear ratio provided by the gear mechanism; and first and second engagement devices, wherein the drive-force transmitting apparatus defines a plurality of drive-force transmitting paths that are provided in parallel with each other between the input rotary member and the output rotary member such that the drive force is to be transmitted from the input rotary member to the output rotary member through the drive-force transmitting paths, wherein the plurality of drive-force transmitting paths include a first drive-force transmitting path that is to be established by engagement of the first engagement device, such that the drive force is to be transmitted by the gear mechanism through the first drive-force transmitting path when the first drive-force transmitting path is established, and wherein the plurality of drive-force transmitting paths include a second drive-force transmitting path that is to be established by engagement of the second engagement device, such that the drive force is to be transmitted by the continuously-variable transmission mechanism through the second drive-force transmitting path when the second drive-force transmitting path is established. JP-2017-101745A discloses such a control apparatus for a drive-three transmitting apparatus. In the disclosed control apparatus, when the first drive-force transmitting path is established for transmitting the drive force by the gear mechanism, the gear ratio of the continuously-variable transmission mechanism is set to a highest gear ratio, and a pulley hydraulic pressure applied to the secondary pulley is made higher than a pulley hydraulic pressure applied to the primary pulley.

SUMMARY OF THE INVENTION

By the way, there is an arrangement in which a shift-up action of the drive-force transmitting apparatus is executed to switch from a first state in which the first drive-force transmitting path is established to a second state in which the second drive-force transmitting path is established, when an actual gear ratio of the continuously-variable transmission mechanism is the highest gear ratio. Thus, upon execution of the shift-up action of the drive-force transmitting apparatus, a rotational speed difference of the second engagement device is made so small that an amount of heat generation is restrained in the second engagement device. Therefore, in the first state in which the first drive-force transmitting path is established, in the event of a so-called "highest-gear-ratio-side return failure" in which the actual gear ratio of the continuously-variable transmission mechanism is not returned to the highest gear ratio in spite of a target gear ratio of the continuously-variable transmission mechanism being set to the highest gear ratio, it might be better to immediately change the actual gear ratio to the highest gear ratio. Further, when the vehicle is to start running in the second state in which the second drive-force transmitting path is established, it might be better to cause the vehicle to start running with the actual gear ratio of the continuously-variable transmission mechanism being the highest gear ratio, for enabling the vehicle to start running with a high drive force performance. Therefore, also in the second state, it might be better to immediately change the actual gear ratio to the highest gear ratio, in the event of the highest-gear-ratio-side return failure, so that the highest-gear-ratio-side return failure is immediately cleared. However, if the pulley hydraulic pressure applied to the primary pulley is temporarily reduced by a large degree so as to immediately change the actual gear ratio to the highest gear ratio, there is a risk that slippage could be caused in the transfer element due to insufficiency of a torque capacity of the transfer element, particularly, when an input torque applied to the continuously-variable transmission mechanism is large. On the other hand, if the actual gear ratio is changed to the highest gear ratio at a constant rate that would be appropriate to prevent slippage of the transfer element, irrespective of magnitude of the input torque applied to the continuously-variable transmission mechanism, a timing of initiation of the shift-up action of the drive-force transmitting apparatus could be delayed.

The present invention was made in view of the background art described above. It is therefore an object of the present invention to provide a control apparatus for a vehicle drive-force transmitting apparatus, which is capable, in the event of the highest-gear-ratio-side return failure, of quickly clearing the highest-gear-ratio-side return failure to restrain heat generation of the second engagement device upon execution of a shift-up action of the drive-force transmitting apparatus, and also preventing or reducing slippage of the transfer element of the drive-force transmitting apparatus.

The object indicated above is achieved according to the following aspects of the present invention.

According to a first aspect of the invention, there is provided a control apparatus for a drive-force transmitting apparatus that is to be provided in a vehicle having a drive force source and drive wheels, wherein the drive-force transmitting apparatus includes: (i) an input rotary member to which a drive force is to be transmitted from the drive force source; (ii) an output rotary member from which the drive force is to be outputted to the drive wheels; (iii) a gear mechanism configured to provide at least one gear ratio; (iv) a continuously-variable transmission mechanism including a primary pulley, a secondary pulley, and a transfer element that is looped over the primary and secondary pulleys, and configured to provide a variable gear ratio that is lower than at least one of the at least one gear ratio provided by the gear mechanism; and (v) first and second engagement devices, wherein the drive-force transmitting apparatus defines a plurality of drive-force transmitting paths that are provided in parallel with each other between the input rotary member and the output rotary member such that the drive force is to be transmitted from the input rotary member to the output rotary member through the drive-force transmitting paths, wherein the plurality of drive-force transmitting paths include a first drive-force transmitting path that is to be established by engagement of the first engagement device, such that the drive force is to be transmitted by the gear mechanism through the first drive-force transmitting path in a first state of the drive-force transmitting apparatus in which the first drive-force transmitting path is established, wherein the plurality of drive-force transmitting paths include a second drive-force transmitting path that is to be established by engagement of the second engagement device, such that the drive force is to be transmitted by the continuously-variable transmission mechanism through the second drive-force transmitting path in a second state of the drive-force transmitting apparatus in which the second drive-force transmitting path is established, wherein the control apparatus comprises a state determining portion configured, when a target gear ratio of the continuously-variable transmission mechanism is set to a highest gear ratio of the continuously-variable transmission mechanism, to determine whether the continuously-variable transmission mechanism is in a failure state in which the an actual gear ratio of the continuously-variable transmission mechanism is not the highest gear ratio, wherein the control apparatus comprises a transmission-shifting control portion configured, when the state determining portion determines that the continuously-variable transmission mechanism is in the failure state, to set the target gear ratio to a transient target gear ratio that is changed toward the highest gear ratio, for causing the actual gear ratio to be changed toward the highest gear ratio, and wherein the transmission-shifting control portion is configured to make a rate of change of the transient target gear ratio higher in the first state of the drive-force transmitting apparatus than in the second state of the drive-force transmitting apparatus. For example, the continuously-variable transmission mechanism further includes a primary thrust applier configured to apply a primary thrust to the primary pulley, and a secondary thrust applier configured to apply a secondary thrust to the second primary pulley, such that the transfer element is to be clamped based on the primary thrust by the primary pulley and is to be clamped based on the secondary thrust by the secondary pulley, and such that the variable gear ratio of the continuously-variable transmission mechanism is increased with increase of a thrust ratio that is a ratio of the secondary thrust to the primary thrust, and is reduced with reduction of the thrust ratio, wherein the transmission-shifting control portion is configured, when setting the target gear ratio to the transient target gear ratio, to control the thrust ratio, based on a deviation of the actual gear ratio from the transient target gear ratio as the target gear ratio, such that the deviation is reduced.

According to a second aspect of the invention, in the control apparatus according to the first aspect of the invention, the transmission-shifting control portion is configured, when setting the target gear ratio to the transient target gear ratio, to make the rate of the change of the transient target gear ratio lower when a difference between the actual gear ratio and the highest gear ratio becomes small, than when the difference is still large.

According to a third aspect of the invention, in the control apparatus according to the first or second aspect of the invention, the second drive-force transmitting path includes a drive-force transmitting path section that is located between the secondary pulley and the output rotary member, wherein the second engagement device is disposed in the drive-force transmitting path section, and wherein the transmission-shifting control portion is configured, when setting the target gear ratio to the transient target gear ratio in the first state, to make the rate of the change of the transient target gear ratio higher as a rotational speed of the secondary pulley is higher.

According to a fourth aspect of the invention, in the control apparatus according to any one of the first through third aspects of the invention, the transmission-shifting control portion is configured to switch the drive-force transmitting apparatus from the first state to the second state, with the actual gear ratio being the highest gear ratio.

According to a fifth aspect of the invention, in the control apparatus according to any one of the first through fourth aspects of the invention, the transmission-shifting control portion is configured, in the first state of the drive-force transmitting apparatus, to set the target gear ratio of the continuously-variable transmission mechanism to the highest gear ratio.

According to a sixth aspect of the invention, in the control apparatus according to any one of the first through fifth aspects of the invention, the transmission-shifting control portion is configured, when the vehicle is to start running, to set the target gear ratio of the continuously-variable transmission mechanism to the highest gear ratio.

According to a seventh aspect of the invention, in the control apparatus according to the first through sixth aspects of the invention, the transmission-shifting control portion is configured, when setting the target gear ratio of the continuously-variable transmission mechanism to the transient target gear ratio, to make the rate of change of the transient target gear ratio higher in a transient state of switching of an operation state of the second engagement device between a fully engaged state and a fully released state than in the second state.

According to an eighth aspect of the invention, in the control apparatus according to any one of the first through seventh aspects of the invention, the transmission-shifting control portion is configured, when setting the target gear ratio of the continuously-variable transmission mechanism to the transient target gear ratio, to make the rate of change of the transient target gear ratio lower in a transient state of switching of an operation state of the second engagement device between a fully engaged state and a fully released state than in the first state.

In the control apparatus according to the first aspect of the invention, when the target gear ratio of the continuously-variable transmission mechanism is set to the highest gear ratio and the actual gear ratio of the continuously-variable transmission mechanism is not the highest gear ratio, namely, when the highest-gear-ratio-side return failure occurs, the target gear ratio of the continuously-variable transmission mechanism is set to the transient target gear ratio rather than to the highest gear ratio, wherein the transient target gear ratio is changed toward the highest gear ratio, for causing the actual gear ratio to be changed toward the highest gear ratio. Thus, in the event of occurrence of the highest-gear-ratio-side return failure, the actual gear ratio is changed to the highest gear ratio in an appropriate manner. Further, when the target gear ratio is set to the transient target gear ratio, the rate of change of the transient target gear ratio is made higher in the first state in which the first drive force transmitting path is established than in the second state in which the second drive-force transmitting path is established, so that the highest-gear-ratio-side return failure is quickly cleared in the first state in which the first drive-force transmitting path is established. In the first state in which the first drive-force transmitting path is established, since the second engagement device is fully released, an input torque inputted to the continuously-variable transmission mechanism is made smaller than in the second state in which the second drive-force transmitting path is established with the second engagement device being fully engaged. Therefore, in the first state in which the first drive-force transmitting path is established, slippage of the transfer element is likely to be prevented or reduced even if the rate of change of the transient target gear ratio is made relatively high. On the other hand, in the second state in which the second drive-force transmitting path is established and the input torque inputted to the continuously-variable transmission mechanism is made relatively large, the rate of change of the transient target gear ratio is made relatively low so that the slippage of the transfer element is likely to be prevented or reduced. Therefore, in the event of occurrence of the highest-gear-ratio-side return failure, it is possible to quickly clear the highest-gear-ratio-side return failure to restrain heat generation of the second engagement device upon execution of a shift-up action of the drive-force transmitting apparatus, and also preventing or reducing slippage of the transfer element of the drive-force transmitting apparatus.

In the control apparatus according to the second aspect of the invention, in the case in which the target gear ratio is set to the transient target gear ratio, the rate of the change of the transient target gear ratio is made lower when the difference between the actual gear ratio and the highest gear ratio becomes small, than when the difference is still large. Thus, the actual gear ratio is made gradually close to the highest gear ratio.

In the control apparatus according to the third aspect of the invention, in the case in which the target gear ratio is set to the transient target gear ratio in the first state in which the first drive-force transmitting path is established, the rate of the change of the transient target gear ratio is made higher as a rotational speed of the secondary pulley is higher. Thus, in the first state in which the first drive-force transmitting path is established, the highest-gear-ratio-side return failure is more quickly cleared.

In the control apparatus according to the fourth aspect of the invention, the drive-force transmitting apparatus is switched from the first state in which the first drive-force transmitting path is established to the second state in which the second drive-force transmitting path is established, in a state in which the actual gear ratio is the highest gear ratio. Thus, with the highest-gear-ratio-side return failure being quickly cleared in the first state in which the first drive-force transmitting path is established, it is possible to appropriately become ready for a shift-up action of the drive-force transmitting apparatus.

In the control apparatus according to the fifth aspect of the invention, in the first state in which the first drive-force transmitting path is established, the target gear ratio of the continuously-variable transmission mechanism is set to the highest gear ratio, so that it is possible to become ready for a shift-up action of the drive-force transmitting apparatus.

In the control apparatus according to the sixth aspect of the invention, when the vehicle is to start running, the target gear ratio of the continuously-variable transmission mechanism is set to the highest gear ratio, so that it is possible to easily assure a high drive force performance when the vehicle starts running even in the second state in which the second drive-force transmitting path is established.

In the control apparatus according to the seventh aspect of the invention, when the target gear ratio of the continuously-variable transmission mechanism is set to the transient target gear ratio, the rate of change of the transient target gear ratio is made higher in the transient state of switching of the operation state of the second engagement device between the fully engaged state and the fully released state than in the second state in which the second drive-force transmitting path is established. Thus, the highest-gear-ratio-side return failure is quickly cleared in the transient state of switching of the operation state of the second engagement device. In the transient state of switching of the operation state of the second engagement device, the input torque inputted to the continuously-variable transmission mechanism is made smaller than in the second state in which the second drive-force transmitting path is established. Therefore, in the transient state of switching of the operation state of the second engagement device, the slippage of the transfer element is unlikely to be caused even if the rate of change of the transient target gear ratio is made relatively high.

In the control apparatus according to the eighth aspect of the invention, when the target gear ratio of the continuously-variable transmission mechanism is set to the transient target gear ratio, the rate of change of the transient target gear ratio is made lower in the transient state of switching of the operation state of the second engagement device between the fully engaged state and the fully released state than in the first state in which the first drive-force transmitting path is established. Thus, even in the transient state of switching of the operation state of the second engagement device, the slippage of the transfer element can be easily prevented or reduced, although the input torque inputted to the continuously-variable transmission mechanism is made larger than in the first state in which the first drive-force transmitting path is established.

DETAILED DESCRIPTION OF PREFERRED EMBODIMENT

Figure 1:
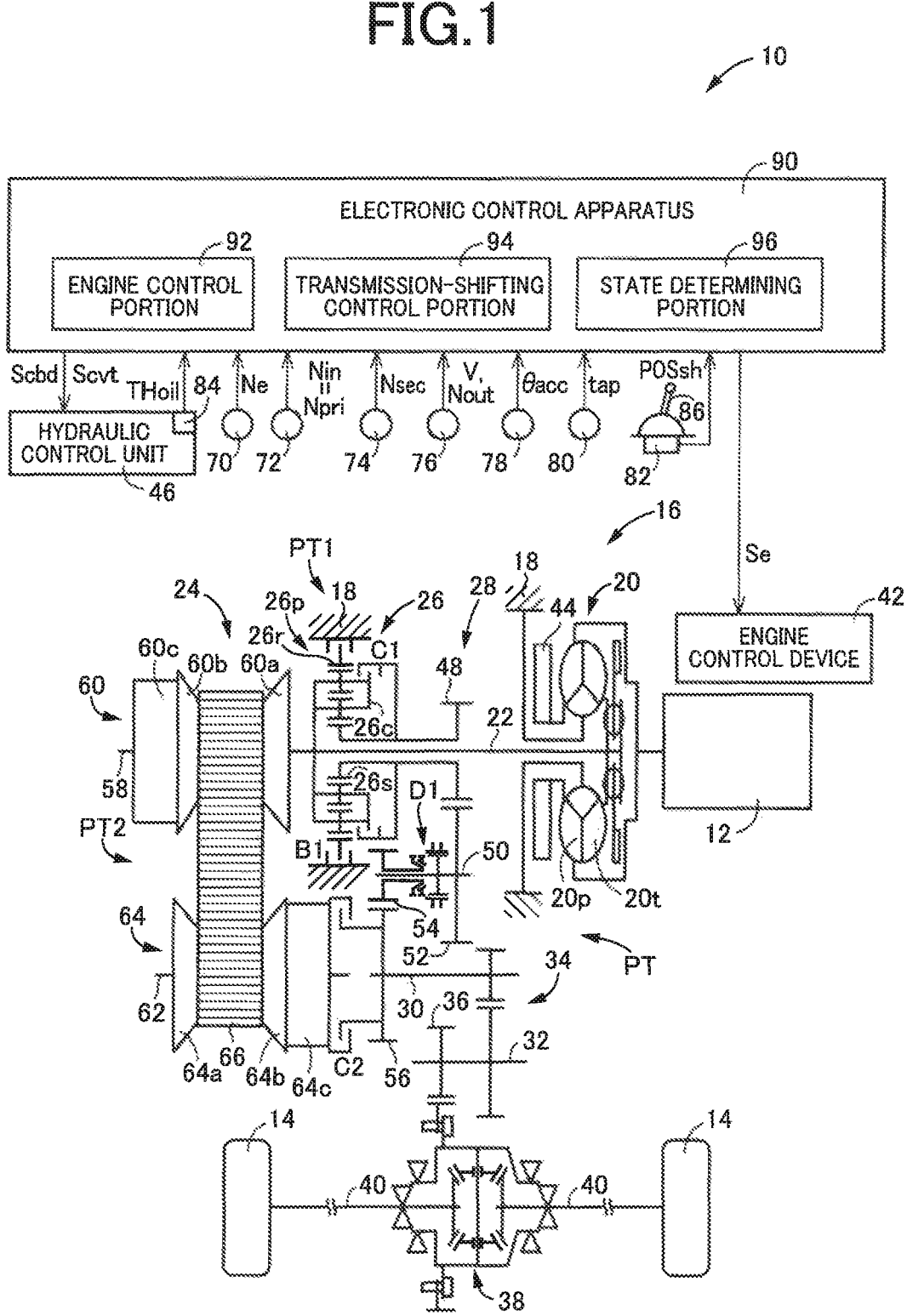
FIG. 1 is a schematic view showing a construction of a vehicle to be controlled by a control apparatus according to the present invention, and major control functions and control portions of the control apparatus.

In the embodiment of the present invention, each of the primary pulley (i.e., input-side pulley) and the secondary pulley (i.e., output-side pulley) includes, for example, a fixed sheave, a movable sheave and a hydraulic actuator, which is configured to apply a thrust for changing a width of an annular groove defined between the fixed and movable sheaves of a corresponding one of the primary and secondary pulleys. A vehicle provided with the above-described drive-force transmitting apparatus includes a hydraulic control unit configured to control pulley hydraulic pressures supplied as working hydraulic pressures to the respective hydraulic actuators, independently of each other. The hydraulic control unit may be configured to control an amount of flow of a working fluid supplied to each of the hydraulic actuators so as to consequently generate the pulley hydraulic pressures, for example. A shifting control operation is performed by the hydraulic control unit to execute a shifting action to establish a target gear ratio while preventing slippage of a transfer element in the continuously-variable transmission mechanism, by controlling the thrust (=pulley hydraulic pressure*pressure receiving area) applied to each of the primary and secondary pulleys. The transfer element, which is looped over the primary and secondary pulleys, may be a compression-type endless annular transmission belt including at least one endless annular hoop and a multiplicity of thick-plate-shaped block elements that are held by the at least one endless annular hoop so as to be arranged in their thickness direction corresponding to a circumferential direction of the transmission bell, along the at least one endless annular hoop, or alternatively, a tension-type belt constituting an endless annular link chain including a plurality of link plates alternately superposed and mutually connected at their end portions through connecting pins. The above-described continuously variable transmission mechanism is a known belt-type continuously-variable transmission, and can be broadly interpreted to conceptually encompass not only the belt-type continuously-variable transmission but also a chain-type continuously-variable transmission.

It is noted that the term "gear ratio" is defined as "rotational speed of input-side rotary member/rotational speed of output-side rotary member". For example, the gear ratio of the above-described continuously-variable transmission is defined as "rotational speed of the primary pulley/rotational speed of the secondary pulley", and the gear ratio of the above-described drive-force transmitting apparatus is defined as "rotational speed of the input rotary member/rotational speed of the output rotary member". A vehicle running speed could be lower as the gear ratio is higher, and could be higher as the gear ratio is lower. The above-described highest gear ratio of the continuously-variable transmission mechanism can be expressed also as a lowest-speed gear ratio.

The above-described drive force source is, for example, an internal combustion engine such as a gasoline engine and a diesel engine generating a drive force by combustion of fuel supplied thereto. The vehicle may be equipped with, in addition to or in place of a drive force source in the form of the engine, another drive force source in the form of, for example, an electric motor.

Hereinafter, a preferred embodiment of the invention will be described in detail with reference to the accompanying drawings.

Embodiment

FIG. 1 is a schematic view showing a construction of a vehicle 10 to be controlled by a control apparatus according to the present invention, and major control functions and control portions of the control apparatus. As shown in FIG. 1, the vehicle 10 is provided with an engine 12 functioning as a drive force source configured to generate a drive force, drive wheels 14 and a drive-force transmitting apparatus 16 that is provided in drive-force transmitting paths between the engine 12 and the drive wheels 14.

The drive-force transmitting apparatus 16 includes a non-rotary member in the form of a casing 18, a fluid-operated type drive-force transmitting device in the form of a known torque converter 20 that is connected to the engine 12, an input shaft 22 connected to the torque converter 20, a continuously-variable transmission mechanism 24 connected to the input shaft 22, a forward/reverse switching device 26 connected to the input shaft 22, a gear mechanism 28 which is provided in parallel with the continuously-variable transmission mechanism 24 and which is connected to the input shaft 22 via the forward/reverse switching device 26, an output shaft 30 serving as an output rotary member that is common to the continuously-variable transmission mechanism 24 and the gear mechanism 28, a counter shaft 32, a reduction gear device 34 consisting of a pair of mutually meshing gears each of which is connected to a corresponding one of the output shaft 30 and the counter shaft 32 so as to unrotatable relative to the corresponding one of the shafts 30, 32, a gear 36 connected to the counter shaft 32 so as to be unrotatable relative to the counter shaft 32, and a differential gear device 38 connected to the gear 36. The torque converter 20, input shaft 22, continuously-variable transmission mechanism 24, forward/reverse switching device 26, gear mechanism 28, output shaft 30, counter shaft 32, reduction gear device 34, gear 36 and differential gear device 38 are disposed within the casing 18. The drive-force transmitting apparatus 16 further includes right and left axles 40 that are connected to the differential gear device 38. The input shaft 22 serves as an input rotary member to which the drive force of the engine 12 is to be inputted. The output shaft 30 serves as the output rotary member through which the drive force of the engine 12 is to be outputted. It is noted that the above-described drive force is synonymous with a drive torque or a drive power unless otherwise distinguished from them.

In the drive-force transmitting apparatus 16 constructed as described above, the drive force generated by the engine 12 is transmitted to the right and left drive wheels 14, via the torque converter 20, forward/reverse switching device 26, gear mechanism 28, reduction gear device 34, differential gear device 38, axles 40 and other elements, or alternatively, via the torque converter 20, continuously-variable transmission mechanism 24, reduction gear device 34, differential gear device 38; axles 40 and other elements.

As described above, the drive-force transmitting apparatus 16 has the gear mechanism 28 and the continuously-variable transmission mechanism 24 that are provided in parallel with each other in respective drive-force transmitting paths PT between the engine 12 and the drive wheels 14. Specifically, the drive-force transmitting apparatus 16 has the gear mechanism 28 and the continuously-variable transmission mechanism 24 that are provided in parallel with each other in the respective drive-force transmitting paths PT between the input shaft 22 and the output shaft 30. That is, the drive-force transmitting apparatus 16 defines the plurality of drive-force transmitting paths that are parallel with each other between the input shaft 22 and the output shaft 30, such that the drive force of the engine 12 is to be transmitted from the input shaft 22 to the output shaft 30 through a selected one of the drive-force transmitting paths PT. The plurality of drive-force transmitting paths PT consist of a first drive-force transmitting path PT1 constituted mainly by the gear mechanism 28 and a second drive-force transmitting path PT2 constituted mainly by the continuously-variable transmission mechanism 24. The first and second drive-force transmitting paths PT1, PT2 are defined in parallel with each other between the input shaft 22 and the output shaft 30. The first drive-force transmitting path PT1 is a path through which the drive force of the engine 12 is to be transmitted from the input shaft 22 toward the drive wheels 14 through the gear mechanism 28. The second drive-force transmitting path PT2 is a path through which the drive force of the engine 12 is to be transmitted from the input shaft 22 toward the drive wheels 14 through the continuously-variable transmission mechanism 24.

In the drive-force transmitting apparatus 16, the drive force of the engine 12 is transmitted toward the drive wheels 14 through a selected one of the first and second drive-force transmitting paths PT1, PT2, which is selected depending on a running state of the vehicle 10. To this end, the drive-force transmitting apparatus 16 includes a plurality of engagement devices by which the selected one of the first and second drive-force transmitting paths PT1, PT2 is established. The plurality of engagement devices include a first clutch C1, a first brake 131 and a second clutch C2. The first clutch C1, which serves as an engagement device, is provided in the first drive-force transmitting path PT1 and configured to selectively connect and disconnect the first drive-force transmitting path PT1, such that the first drive-force transmitting path PT1 is established with engagement of the first clutch C1 for forward running of the vehicle 10. The first brake B1, which serves as another engagement device, is provided in the first drive-force transmitting path PT1 and configured to selectively connect and disconnect the first drive-force transmitting path PT1, such that the first drive-force transmitting path PT1 is established with engagement of the first brake B1 for reverse running of the vehicle 10. That is, the first drive-force transmitting path PT1 is established with either the first clutch C1 or the first brake B1 being engaged. The second clutch C2, which serves as still another engagement device, is disposed in the second drive-force transmitting path PT2 and configured to selectively connect and disconnect the second drive-force transmitting path PT2, such that the second drive-force transmitting path PT2 is established with engagement of the second clutch C2. That is, the second drive-force transmitting path PT2 is established with the second clutch C2 being engaged. Each of the first clutch C1, first brake B1 and second clutch C2 is a known hydraulically-operated wet-type frictional engagement device that is to be frictionally engaged by operation of a corresponding one of hydraulic actuators C1a, B1a, C2a. Each of the first clutch C1 and the first brake B1 corresponds to "a first engagement device" recited in the appended claims. The first clutch C1 is the first engagement device for a forward running of the vehicle 10, while the first brake B1 is the first engagement device for a reverse running of the vehicle 10. The second clutch C2 corresponds to "a second engagement device" recited in the appended claims. As described below, each of the first clutch C1 and the first brake B1 constitutes a part of the forward/reverse switching device 26.

The engine 12 is provided with an engine control device 42 including an electronic throttle device, a fuel injection device, an ignition device and other devices that are required for controlling an output of the engine 12. In the engine 12, the engine control device 42 is controlled, by an electronic control apparatus 90 (that corresponds to a control apparatus recited in the appended claims), based on an operation amount θacc of an accelerator pedal that corresponds to a required drive force of the vehicle 10 required by an operator of the vehicle 10, whereby an engine torque Te as an output torque of the engine 12 is controlled.

The torque converter 20 is provided with a pump impeller 20p and a turbine impeller 20t that are connected to the engine 12 and the input shaft 22, respectively. The drive-force transmitting apparatus 16 is provided with a mechanical oil pump 44 connected to the pump impeller 20p. The oil pump 44 is to be driven by the engine 12, to supply a working fluid pressure as its original pressure to a hydraulic control unit (hydraulic control circuit) 46 provided in the vehicle 10, for performing a shifting control operation in the continuously-variable transmission mechanism 24, generating a belt clamping force in the continuously-variable transmission mechanism 24, and switching an operation state of each of the above-described engagement devices between its engaged state and released state.

The forward/reverse switching device 26 includes a planetary gear device 26p of double-pinion type in addition to the first clutch C1 and the first brake B1. The planetary gear device 26p is a differential mechanism including three rotary elements consisting of an input element in the form of a carrier 26c, an output element in the form of a sun gear 26s and a reaction element in the form of a ring gear 26r. The carrier 26c is connected to the input shaft 22. The ring gear 26r is operatively connected to the casing 18 through the first brake B1. The sun gear 26s is connected to a small-diameter gear 48 that is provided to be coaxial with the input shaft 22 and rotatable relative to the input shall 22. The carrier 26c and the sun gear 26s are operatively connected to each other through the first clutch C1.

The gear mechanism 28 includes, in addition to the above-described small-diameter gear 48, a gear-mechanism counter shaft 50 and a large-diameter gear 52 which meshes with the small-diameter gear 48 and which is provided to be coaxial with the gear-mechanism counter shaft 50 and unrotatable relative to the gear-mechanism counter shaft 50. The large-diameter gear 52 has a diameter larger than that of the small-diameter gear 48. The gear mechanism 28 further includes an idler gear 54 that is provided to be coaxial with the gear-mechanism counter shaft 50 and rotatable relative to the gear-mechanism counter shaft 50, and an output gear 56 that is provided to be coaxial with the output shaft 30 and unrotatable relative to the output shaft 30. The output gear 56 has a diameter larger than that of the idler gear 54. Therefore, the gear mechanism 28 provides a gear ratio between the input shaft 22 and the output shaft 30 in the first drive-force transmitting path PT1. That is, the gear mechanism 28 corresponds to a gear mechanism configured to provide at least one gear ratio. The gear mechanism 28 further includes a dog clutch D1 as an engagement device that is disposed on the gear-mechanism counter shaft 50 between the large-diameter gear 52 and the idler gear 54 so as to selectively connect and disconnect a drive-force transmitting path between the two gears 52, 54. The dog clutch D1 is configured to selectively connect and disconnect the first drive-force transmitting path PT1, such that the first drive-force transmitting path PT1 is established with engagement of the dog clutch D1. The dog clutch D1, which is also included in the above-described plurality of engagement devices, serves as an engagement device that cooperates with the first clutch C1 or the first brake B1 to establish the first drive-force transmitting path PT1. That is, the first drive-force transmitting path PT1 is established with both of the dog clutch D1 and the first clutch C1 or both of the dog clutch D1 and the first brake B1 being engaged. An operation state of the dog clutch D1 is switched by operation of a hydraulic actuator (not shown) that is included in the drive-force transmitting apparatus 16.

The first drive-force transmitting path PT1 is established with both of the dog clutch D1 and the first engagement device being engaged, namely, with both of engagement of the dog clutch D1 and engagement of either one of the first clutch C1 and the first brake B1 which cooperate with each other to constitute the first engagement device and which are located to be closer to the input shaft 22 than the dog clutch D1. When the first clutch C1 as well as the dog clutch D1 is engaged, the first drive-force transmitting path PT1 for forward running of the vehicle 10 is established. When the first brake 131 as well as the dog clutch D1 is engaged, the first drive-force transmitting path PT1 for reverse running of the vehicle 10 is established. In the drive-force transmitting apparatus 16, with the first drive-force transmitting path PT1 being established, the drive-force transmitting apparatus 16 is placed in its drive-force transmittable state in which the drive force of the engine 12 is transmittable from the input shaft 22 to the output shaft 30 through the gear mechanism 28. With the first drive-force transmitting path PT1 being cut off by release of both of the first clutch C1 and the first brake B1 or by release of the dog clutch D1, the drive-force transmitting apparatus 16 is placed in its neutral state in which the drive force is not transmittable.

Figure 2:
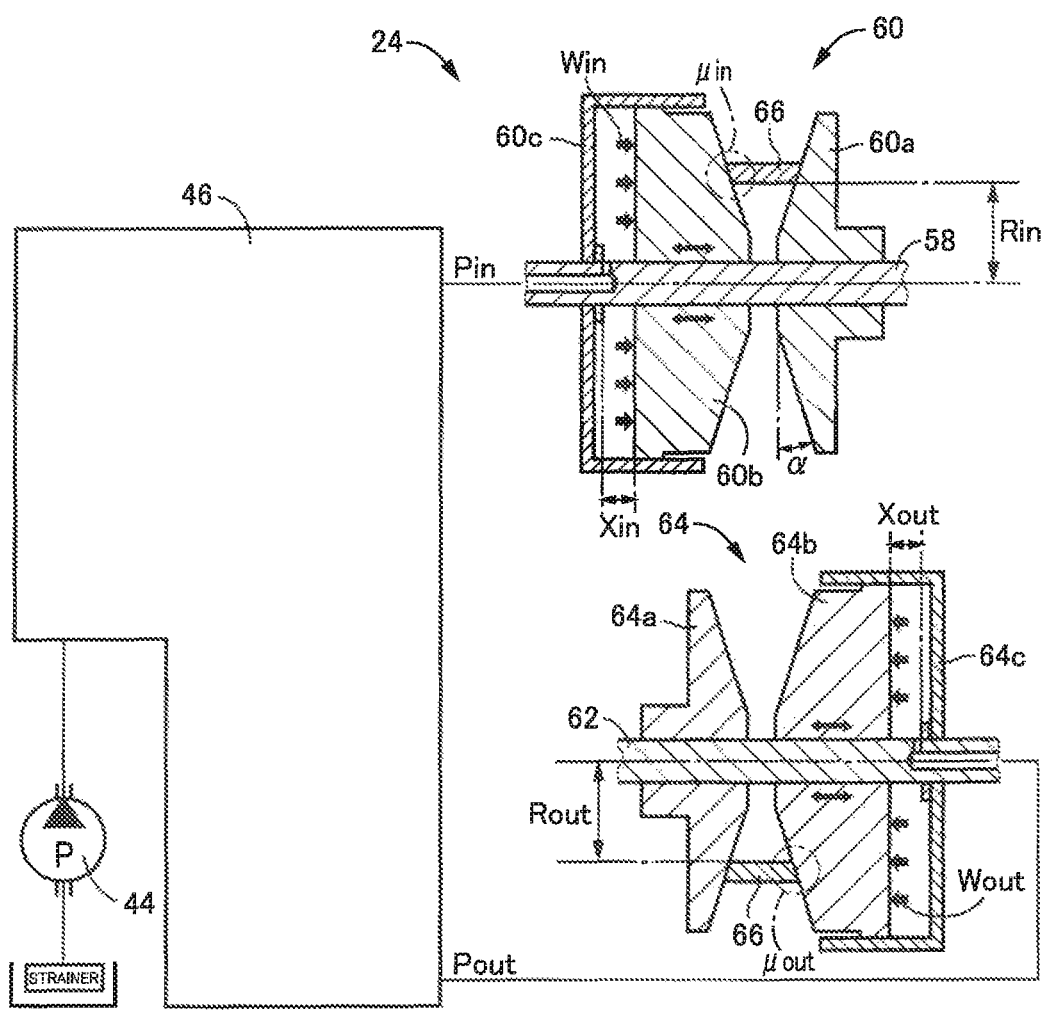
FIG. 2 is a view for explaining a construction of a continuously-variable transmission mechanism and a construction of a hydraulic control unit.

FIG. 2 is a view for explaining a construction of the continuously-variable transmission mechanism 24. As shown in FIGS. 1 and 2, the continuously-variable transmission mechanism 24 includes a primary shaft 58 provided to be coaxial with the input shaft 22 and connected integrally to the input shaft 22, a primary pulley 60 connected to the primary shaft 58 and having a variable effective diameter, a secondary shaft 62 provided to be coaxial with the output shaft 30, a secondary pulley 64 connected to the secondary shaft 62 and having a variable effective diameter, and a transfer element in the form of a transmission belt 66 looped over or mounted on the pulleys 60, 64. The continuously-variable transmission mechanism 24 is a known belt-type continuously-variable transmission in which the drive force is transmitted owing to a friction force generated between the transmission belt 66 and each of the pulleys 60, 64, and is configured to transmit the drive force of the engine 12 toward the drive wheels 14. The friction force is synonymous with a clamping force, and is referred also to as a belt clamping force. The belt clamping force corresponds to a belt torque capacity Tcvt that is a torque capacity of the transmission belt 66 in the continuously-variable transmission mechanism 24.

The primary pulley 60 includes a fixed sheave 60a connected to the primary shaft 58, a movable sheave 60b unrotatable about an axis of the primary shaft 58 and axially movable relative to the fixed sheave 60a, and a primary thrust applier in the form of a hydraulic actuator 60c configured to apply a primary thrust Win to the movable sheave 60b. The primary thrust Win is a thrust (=primary pressure Pin*pressure receiving area) for changing a width of a V-shaped groove defined between the fixed and movable sheaves 60a, 60b of the primary pulley 60. That is, the primary thrust Win is a thrust applied to the primary pulley 60 from the hydraulic actuator 60c, to clamp the transmission belt 66 that is mounted on the primary pulley 60. The primary pressure Pin is a hydraulic pressure supplied from the hydraulic control unit 46 to the hydraulic actuator 60c, and serves as a pulley hydraulic pressure for generating the primary thrust Win. Meanwhile, the secondary pulley 64 includes a fixed sheave 64a connected to the secondary shaft 62, a movable sheave 64b unrotatable about an axis of the secondary shaft 62 and axially movable relative to the fixed sheave 64a, and a secondary thrust applier in the form of a secondary hydraulic actuator 64c configured to apply a secondary thrust Wout to the movable sheave 64b. The secondary thrust Wout is a thrust (=secondary pressure Pout*pressure receiving area) for changing a width of a V-shaped groove defined between the fixed and movable sheaves 64a, 64b of the secondary pulley 64. That is, the secondary thrust Wout is a thrust applied to the secondary pulley 64 from the secondary hydraulic actuator 64c, to clamp the transmission belt 66 that is mounted on the secondary pulley 64. The secondary pressure Pout is a hydraulic pressure supplied from the hydraulic control unit 46 to the secondary hydraulic actuator 64c, and serves as a pulley hydraulic pressure for generating the secondary thrust Wout.

In the continuously-variable transmission mechanism 24, the primary and secondary pressures Pin, Pout are controlled by the hydraulic control unit 46 that is controlled by the electronic control apparatus 90, whereby the primary and secondary thrusts Win, Wout are respectively controlled. With the primary and secondary thrusts Win, Wout being controlled, the widths of the V-shaped grooves of the respective pulleys 60, 64 are controlled to be changeable whereby a belt winding diameter (effective diameter) of each of the pulleys 60, 64 is changeable and accordingly a gear ratio γcvt (=primary rotational speed Npri/secondary rotational speed Nsec) of the continuously-variable transmission mechanism 24 is changeable. Further, with the primary and secondary thrusts Win, Wout being controlled, the belt clamping force is controlled such that slipping of the transmission belt 66 is not caused. That is, with the primary and secondary thrusts Win, Wout being controlled, the gear ratio γcvt of the continuously-variable transmission mechanism 24 is controlled to a target gear ratio γcvttgt while the transmission belt 66 is prevented from being slipped. It is noted that the primary rotational speed Npri represents a rotational speed of the primary shaft 58 and that the secondary rotational speed Nsec represents a rotational speed of the secondary shaft 62.

In the continuously-variable transmission mechanism 24, when the primary pressure Pin is increased, the width of the V-shaped groove of the primary pulley 60 is reduced whereby the gear ratio γcvt is reduced. The reduction of the gear ratio γcvt corresponds to a shift-up action performed in the continuously-variable transmission mechanism 24. In the continuously-variable transmission mechanism 24, the lowest gear ratio γmin is provided with the width of the V-shaped groove of the primary pulley 60 being minimized. Within a range of the gear ratio γcvt that can be provided by the continuously-variable transmission mechanism 24, the lowest gear ratio gear ratio γmin is a value of the gear ratio γcvt which makes it possible to maximize the running speed of the vehicle 10. Further, in the continuously-variable transmission mechanism 24, when the primary pressure Pin is reduced, the width of the V-shaped groove of the primary pulley 60 is increased whereby the gear ratio γcvt is increased. The increase of the gear ratio γcvt corresponds to a shift-down action performed in the continuously-variable transmission mechanism 24. In the continuously-variable transmission mechanism 24, the highest gear ratio γmax is provided with the width of the V-shaped groove of the primary pulley 60 being maximized. Within the range of the gear ratio γcvt that can be provided by the continuously-variable transmission mechanism 24, the highest gear ratio gear ratio γmax is a value of the gear ratio γcvt which makes it possible to minimize the running speed of the vehicle 10. In the continuously-variable transmission mechanism 24, the belt slippage is prevented by the primary thrust Win and the secondary thrust Wout, and the target gear ratio γcvttgt is established by a combination of the primary thrust Win and the secondary thrust Wout, rather than by only one of the primary thrust Win and the secondary thrust Wout. As described below, the gear ratio γcvt of the continuously-variable transmission mechanism 24 is changed with change of a thrust ratio τ (=Wout/Win) which is a ratio of the secondary thrust Wout to the primary thrust Win and which is dependent on a relationship between the primary pressure Pin and the secondary pressure Pout. For example, the gear ratio γcvt is increased with increase of the thrust ratio τ, namely, a shift-down action of the continuously-variable transmission mechanism 24 is caused with increase of the thrust ratio τ.

The output shall 30 is provided to be coaxial with the secondary shaft 62 and rotatable relative to the secondary shaft 62. The second clutch C2 is provided in a drive-force transmitting path section (that corresponds to a part of the above-described second drive-force transmitting path PT2) between the secondary pulley 64 and the output shaft 30. The second drive-force transmitting path PT2 is established with engagement of the second clutch C2. In the drive-force transmitting apparatus 16, with the second drive-force transmitting path PT2 being established, the drive-force transmitting apparatus 16 is placed in its drive-force transmittable state in which the drive force of the engine 12 is transmittable from the input shaft 22 to the output shaft 30 through the continuously-variable transmission mechanism 24. With the second drive-force transmitting path PT2 being cut off by release of the second clutch C2, the drive-force transmitting apparatus 16 is placed in its neutral state in which the drive force is not transmittable. The gear ratio γcvt of the continuously-variable transmission mechanism 24 corresponds to a gear ratio established in the second drive-force transmitting path PT2.

In the drive-force transmitting apparatus 16, a gear ratio EL of the gear mechanism 28, which is a gear ratio γgear (=input-shaft rotational speed Nin/output-shaft rotational speed Nout) provided in the first drive-force transmitting path PT1, is higher than the above-described highest gear ratio γmax of the continuously-variable transmission mechanism 24 which is the highest gear ratio provided in the second drive-force transmitting path PT2. That is, the gear ratio EL is a value that makes it possible to reduce the running speed of the vehicle 10 more than the highest gear ratio γmax. The gear ratio EL of the gear mechanism 28 corresponds to a first-speed gear ratio γ1 in the drive-force transmitting apparatus 16. The highest gear ratio γmax of the continuously-variable transmission mechanism 24 corresponds to a second-speed gear ratio γ2 in the drive-force transmitting apparatus 16. Thus, any gear ratio provided in the second drive-force transmitting path PT2 is lower than the gear ratio provided in the first drive-force transmitting path PT1. It is noted that the input-shaft rotational speed Nin represents a rotational speed of the input shaft 22 and that the output-shaft rotational speed Nout represents a rotational speed of the output shaft 30.

The vehicle 10 can run in a selected one of the gear running mode and the belt running mode. The gear running mode is a running mode in which the vehicle 10 is capable of running with the drive force being transmitted through the first drive-force transmitting path PT1 that is established in the drive-force transmitting apparatus 16. The belt running mode is a running mode in which the vehicle 10 is capable of running with the drive force being transmitted through the second drive-force transmitting path PT2 that is established in the drive-force transmitting apparatus 16. When forward running of the vehicle 10 is to be made in the gear running mode, the first clutch C1 and the dog clutch D1 are engaged while the second clutch C2 and the first brake B1 are released. When reverse running of the vehicle 10 is to be made in the gear running mode, the first brake B1 and the dog clutch D1 are engaged while the second clutch C2 and the first clutch C1 are released. In the belt running mode, forward running of the vehicle 10 can be made.

The gear running mode is selected to be established when the vehicle 10 runs at a running speed within a relative low speed range or when the vehicle 10 is stopped. The belt running mode is selected to be established when the vehicle 10 runs at a running speed within a relatively high speed range including a middle speed range as well as a high speed range. When the belt running mode is established in the middle speed range, the dog clutch D1 is engaged. When the belt running mode is established in the high speed range, the dog clutch D1 is released, for example, for the purpose of avoiding drag of the gear mechanism 28 and other elements during running of the vehicle 10 in the belt running mode and preventing gears of the gear mechanism 28 and components (such as pinion gears) of the planetary gear device 26p from being rotated at high speeds.

The vehicle 10 is provided with the electronic control apparatus 90 as a controller including the control apparatus constructed according to present invention. For example, the electronic control apparatus 90 includes a so-called microcomputer incorporating a CPU, a ROM, a RAM and an input-output interface. The CPU performs control operations of the vehicle 10, by processing various input signals, according to control programs stored in the ROM, while utilizing a temporary data storage function of the RAM. The electronic control apparatus 90 is configured to perform, for example, an engine control operation for controlling an output of the engine 12, a shifting control operation and a belt-clamping-force control operation for the continuously-variable transmission mechanism 24, and a hydraulic-pressure control operation for switching the operation state of each of the plurality of engagement devices (C1, B1, C2, D1). The electronic control apparatus 90 may be constituted by two or more control units exclusively assigned to perform different control operations such as the engine control operation and the hydraulic-pressure control operation.

The electronic control apparatus 90 receives various input signals based on values detected by respective sensors provided in the vehicle 10. Specifically, the electronic control apparatus 90 receives: an output signal of an engine speed sensor 70 indicative of an engine rotational speed Ne which is a rotational speed of the engine 12; an output-signal of a primary speed sensor 72 indicative of a primary rotational speed Npri which is a rotational speed of the primary shaft 58 which is equivalent to an input-shaft rotational speed Nin; an output signal of a secondary speed sensor 74 indicative of a secondary rotational speed Nsec which is a rotational speed of the secondary shaft 62; an output signal of an output speed sensor 76 indicative of an output-shaft rotational speed Nout which is a rotational speed of the output shaft 30 and which corresponds to the running speed V of the vehicle 10; an output signal of an accelerator-operation amount sensor 78 indicative of an accelerator operation amount θacc which represents an amount of accelerating operation made by a vehicle operator; an output signal of a throttle-opening degree sensor 80 indicative of the throttle opening degree tap; an output signal of a shift position sensor 82 indicative of an operation position POSsh of a manually-operated shifting member in the form of a shift lever 86 provided in the vehicle 10; and an output signal of a temperature sensor 84 indicative of a working fluid temperature THoil that is a temperature of a working fluid in the hydraulic control unit 46. Further, the electronic control apparatus 90 generates various output signals which are supplied to various devices such as the engine control device 42 and the hydraulic control unit 46 and which include an engine-control command signal Se for controlling the engine 12, a hydraulic control command signal Scvt for performing hydraulic controls such as controls of the shifting action and the belt clamping force of the continuously-variable transmission mechanism 24, and a hydraulic-control command signal Scbd for performing hydraulic controls such as controls of operation states of the plurality of engagement devices. It is noted that the input-shaft rotational speed Nin (=primary rotational speed Npri) is equivalent to a rotational speed of the turbine impeller 20t of the of the torque converter 20. It is also noted that the primary rotational speed Npri is equivalent to a rotational speed of the primary pulley 60 and that the secondary rotational speed Nsec is equivalent to a rotational speed of the secondary pulley 64. Further, the electronic control apparatus 90 calculates an actual gear ratio γcvt (=Npri/Nsec) that is an actual value of the gear ratio γcvt of the continuously-variable transmission mechanism 24, based on the primary rotational speed Npri and the secondary rotational speed Nsec.

The shift lever 86 is operable to be placed in a selected one of a plurality of operation positions POSsh that consist of, for example, a parking position P, a reverse position R, a neutral position N and a drive position D. With the shift lever 86 being placed in the parking position P, the drive-force transmitting apparatus 16 is placed in its parking position in which the drive-force transmitting apparatus 16 is placed in its neutral state and rotation of the output shaft 30 is mechanically inhibited (locked). The drive-force transmitting apparatus 16 is placed in the neutral state, for example, by releasing all of the first clutch C1, first brake B1 and second clutch C2. That is, the neutral state is a state of the drive-force transmitting apparatus 16 in which neither the first drive-force transmitting path PT1 nor the second drive-force transmitting path PT2 is established. With the shift lever 86 being placed in the reverse position R, the drive-force transmitting apparatus 16 is placed in its reverse drive position for enabling the reverse running of the vehicle 10 in the gear running mode. With the shift lever 86 being placed in the neutral position N, the drive-force transmitting apparatus 16 is placed in its neutral position in which the drive-force transmitting apparatus 16 is placed in its neutral state. With the shift lever 86 being placed in the drive position D, the drive-force transmitting apparatus 16 is placed in its forward drive position for enabling the forward running of the vehicle 10 in the gear running mode, or enabling the forward running of the vehicle 10 in the belt running mode with execution of an automatic shifting control of the continuously-variable transmission mechanism 24. Each of the drive position D and the reverse position R is an operation position for placing the drive-force transmitting apparatus 16 in a drive-force transmittable state.

For performing various control operations in the vehicle 10, the electronic control apparatus 90 includes an engine control means or portion in the form of an engine control portion 92 and a transmission shifting control means or portion in the form of a transmission-shifting control portion 94.

The engine control portion 92 calculates a target drive force Fwtgt, for example, by applying the accelerator operation amount θacc and the running velocity V to a predetermined or stored relationship (e.g., drive force map) that is obtained by experimentation or determined by an appropriate design theory. The engine control portion 92 sets a target engine torque Tetgt that ensures the target drive force Fwtgt, and outputs the engine-control command signal Se for controlling the engine 12 so as to obtain the target engine torque Tetgt. The outputted engine-control command signal Se is supplied to the engine control device 42.

When the operation position POSsh of the shift lever 86 is the parking position P or the neutral position N during stop of the vehicle 10, the transmission-shifting control portion 94 supplies, to the hydraulic control unit 46, the hydraulic-control command signal Scbd requesting engagement of the dog clutch D1, in preparation of transition to the gear running mode. When the operation position POSsh is switched from the parking position P or the neutral position N to the drive position D during stop of the vehicle 10, the transmission-shifting control portion 94 supplies, to the hydraulic control unit 46, the hydraulic-control command signal Scbd requesting engagement of the first clutch C1, whereby the gear running mode is established to enable forward running of the vehicle 10. When the operation position POSsh is switched from the parking position P or the neutral position N to the reverse position R during stop of the vehicle 10, the transmission-shifting control portion 94 supplies, to the hydraulic control unit 46, the hydraulic-control command signal Scbd requesting engagement of the first brake B1, whereby the gear running mode is established to enable reverse running of the vehicle 10.

When the operation position. POSsh is the drive position D, the transmission-shifting control portion 94 executes a switching control operation for switching the running mode between the gear running mode and the belt running mode. Specifically, the transmission-shifting control portion 94 determines whether shifting from one of first and second speed positions to the other is to be executed or not, by applying the running speed V and the accelerator operation amount θacc to a stepped shifting map in which shift-up lines, shift-down lines and hysteresis between each of the shift-up lines and a corresponding one of the shift-down lines are defined. The first speed position corresponds to the above-described gear ratio EL provided in the gear mechanism 28 by which the drive force is to be transmitted through the first drive-force transmitting path PT1 during the gear running mode. The second speed position corresponds to the above-described highest gear ratio γmax that is the highest one of the gear ratios (or that is a maximum value within a given range of a continuously-variable gear ratio) provided in the continuously-variable transmission mechanism 24 by which the drive force is to be transmitted through the second drive-force transmitting path PT2 during the belt running mode. Then, when determining that the shifting is to be executed, the transmission-shifting control portion 94 switches the running mode from one of the gear running mode and the belt running mode to the other, so as to execute shifting up or down from one of the first and second speed positions to the other.

When determining that the running mode is to be switched from the gear running mode to the belt running mode so as to execute the shifting up from the first speed position to the second speed position during running in the gear running mode, the transmission-shifting control portion 94 supplies, to the hydraulic control unit 46, the hydraulic-control command signal Scbd requesting releasing and engaging actions of the respective first and second clutches C1, C2, so as to perform a so-called "clutch to clutch" shifting operation. As a result of the shifting up from the first speed position to the second speed position, the second drive-force transmitting path PT2 is established in place of the first drive-force transmitting path PT1 in the drive-force transmitting apparatus 16. Thus, the transmission-shifting control portion 94 executes a stepped shifting control to release and engage the first and second clutches C1, C2, respectively, so as to cause the drive-force transmitting apparatus 16 to execute the shift-up action by which the selected running mode (i.e., selected state) is switched from the gear running mode (i.e., first state) in which the first drive-force transmitting path PT1 is established to the belt running mode (i.e., second state) in which the second drive-force transmitting path PT2 is established. In the following description relating to the present embodiment, the shift-up action, which is executed by the drive-force transmitting apparatus 16 to switch the selected running mode from the gear running mode to the belt running mode, will be referred to as a stepped shift-up action.

When determining that the running mode is to be switched from the belt running mode to the gear running mode so as to execute the shifting down from the second speed position to the first speed position during running in the belt running mode, the transmission-shifting control portion 94 supplies, to the hydraulic control unit 46, the hydraulic-control command signal Scbd requesting releasing and engaging actions of the respective second and first clutches C2, C1, so as to perform the clutch to clutch shifting operation. As a result of the shifting down from the second speed position to the first speed position, the first drive-force transmitting path PT1 is established in place of the second drive-force transmitting path PT2 in the drive-force transmitting apparatus 16. Thus, the transmission-shifting control portion 94 executes a stepped shifting control to engage and release the first and second clutches C1, C2, respectively, so as to cause the drive-force transmitting apparatus 16 to execute the shift-down action by which the selected running mode is switched from the belt running mode in which the second drive-force transmitting path PT2 is established to the gear running mode in which the first drive-force transmitting path PT1 is established. In the following description relating to the present embodiment, the shift-down action, which is executed by the drive-force transmitting apparatus 16 to switch the selected running mode from the belt running mode to the gear running mode, will be referred to as a stepped shift-down action.

In the switching control operation for switching the running mode between the gear running mode and the belt running mode, the switching between the first and second drive force transmitting paths PT1, PT2 is made by only the above-described clutch to clutch shifting operation for making a torque transfer via an transition state in which the dog clutch D1 is engaged in the belt running mode in the middle speed range, so that the switching control operation is performed with a shifting shock being restrained. In the following description regarding the present invention, the control executed to switch between the gear running mode and the belt running mode will be referred to as a clutch-to-clutch shifting control, i.e., C-to-C shifting control.

For executing a shifting action in the continuously-variable transmission mechanism 24 during the belt running mode, the transmission-shifting control portion 94 supplies, to the hydraulic control unit 46, the hydraulic-control command signal Scvt for controlling the primary pressure Pin and the secondary pressure Pout such that the target gear ratio γcvttgt is established in the continuously-variable transmission mechanism 24 while the belt slippage is not caused in the continuously-variable transmission mechanism 24. This hydraulic-control command signal Scvt includes a primary-pressure command signal Spin requesting the primary pressure Pin to become a target primary pressure Pintgt and a secondary-pressure command signal Spout requesting the secondary pressure Pout to become a target secondary pressure Pouttgt.

The target primary pressure Pintgt is a target pulley hydraulic-pressure by which a primary target thrust Wintgt that is a target value of the primary thrust Win applied to the primary pulley 60 is generated. The target secondary pressure Pouttgt is a target pulley hydraulic-pressure by which a secondary target thrust Wouttgt that is a target value of the secondary thrust Wout applied to the secondary pulley 64 is generated. In calculation of each of the primary target thrust Wintgt and the secondary target thrust Wouttgt, a required thrust, which is minimally required to prevent the belt slippage on a corresponding one of the primary and secondary pulleys 60, 64, is taken into consideration. This required thrust is a belt-slip limit thrust Wlmt that is a thrust value shortly before occurrence of the belt slippage in the continuously-variable transmission mechanism 24. In the following description relating to the present invention, the belt-slip limit thrust Wlmt will be referred to as a slip limit thrust Wlmt.

The transmission-shifting control portion 94 calculates the primary target thrust Wintgt and the secondary target thrust Wouttgt. The transmission-shifting control portion 94 compares the secondary thrust Wout, which is calculated based on a primary-side slip limit thrust Winlmt that is the slip limit thrust Wlmt minimally required to prevent slippage of the transmission belt 66 on the primary pulley 60, with a secondary-side slip limit thrust Woutlmt that is the slip limit thrust Wlmt minimally required to prevent slippage of the transmission belt 66 on the secondary pulley 64, and then selects, as the secondary target thrust Wouttgt, a larger one of the secondary thrust Wout and the secondary-side slip limit thrust Woutlmt. The secondary thrust Wout, which is calculated based on the primary-side slip limit thrust Winlmt, is a secondary-side shifting-control thrust Woutsh that is required to be applied to the second pulley 64 in a shifting control, as described below.

The transmission-shifting control portion 94 sets, as the primary target thrust Wintgt, the primary thrust Win calculated based on the secondary target thrust Wouttgt. The primary thrust Win, which is calculated based on the secondary target thrust Wouttgt, is a primary-side shifting-control thrust Winsh that is required to be applied to the primary pulley 60 in a shifting control, as described below. Further, as described below, the transmission-shifting control portion 94 compensates the primary-side shifting-control thrust Winsh, namely, compensates the primary target thrust Wintgt, by a feedback control of the primary thrust Win that is executed based on a gear ratio deviation $\Delta\gamma cvt$ (=$\gamma cvttgt-\gamma cvt$) that is a deviation of the actual gear ratio $\gamma cvt$ from the target gear ratio $\gamma cvttgt$.

In the above-described compensation of the primary-side shifting-control thrust Winsh, a deviation of an actual value from a target value in each parameter that has a one-to-one correspondence relationship with the gear ratio $\gamma cvt$ may be used in place of the gear ratio deviation $\Delta\gamma cvt$. For example, in the compensation of the primary-side shifting-control thrust Winsh, it is possible to use a deviation $\Delta Xin$ (=$Xintgt-Xin$) of an actual position Xin of the movable sheave 60b from a target position Xintgt of the movable sheave 60b in the primary pulley 60 (see FIG. 2), a deviation $\Delta Xout$ (=$Xoutgt-Xout$) of an actual position Xout of the movable sheave 64b from a target position Xintgt of the movable sheave 64b in the secondary pulley 64 (see FIG. 2), a deviation $\Delta Rin$ (=$Rintgt-Rin$) of an actual belt-winding diameter (actual effective diameter) Rin from a target belt-winding diameter (target effective diameter) Rintgt in the primary pulley 60 (see FIG. 2), a deviation $\Delta Rout$ (=$Routtgt-Rout$) of an actual belt-winding diameter (actual effective diameter) Rout from a target belt-winding diameter (target effective diameter) Routtgt in the secondary pulley 64 (see FIG. 2), and a deviation $\Delta Npri$ (=$Npritgt-Npri$) of an actual primary rotational speed Npri from a target primary rotational speed Npritgt.

Each of the above-described primacy side shifting-control thrust Winsh and secondary-side shifting-control thrust Woutsh is a thrust required to be applied to a corresponding one of the primary and secondary pulleys 60, 64 in a shifting control to execute a desired shifting action to establish the target gear ratio $\gamma cvttagt$ at a target shifting speed $d\gamma tgt$ (that is a target value of a shifting speed $d\gamma$). The shifting speed $d\gamma$ is a rate (=$d\gamma cvt/dt$) of change of the gear ratio $\gamma cvt$, namely, an amount (=$d\gamma cvt/dt$) of change of the gear ratio $\gamma cvt$ per a unit of time. In the present embodiment, the shifting speed $d\gamma$ is defined as an amount (=$dX/dNelm$) of pulley displacement per an element of the transmission belt 66, wherein "dX" represents an amount of displacement of the pulley in an axial direction of the pulley per a unit of time, and "dNelm" represents a number of elements (of the transmission belt 66) that are caused to bite into the pulley (i.e., caused to enter the V-shaped groove of the pulley) per the unit of time. The shifting speed $d\gamma$ is represented by a primary shifting speed $d\gamma in$ (=$dXin/dNelmin$) and a secondary shilling speed $d\gamma out$ (=$dXout/dNelmout$).

The thrust, which is applied to each of the pulleys 60, 64 in a steady state in which the gear ratio $\gamma cvt$ is constant, is referred to as a balance thrust Wbl that is referred also to as a steady thrust. The thrust ratio a is represented as a ratio (=$Woutbl/Wirbl$) of a secondary balance thrust Woutbl to a primary balance thrust Winbl, wherein the secondary balance thrust Woutbl is the balance thrust Wbl of the secondary pulley 64 and the primary balance thrust Winbl is the balance thrust Wbl of the primary pulley 60. On the other hand, in the steady state, if one of the thrusts applied to the respective pulleys 60, 64 is increased or reduced by a certain amount, the steady state is lost whereby the gear ratio $\gamma cvt$ is changed thereby generating the shifting speed $d\gamma$ that corresponds to the certain amount by which the one of the thrusts is increased or reduced. The certain amount, by which the thrust is increased or reduced, will be referred to as a gear-ratio changing thrust $\Delta W$ that is referred also to as a transient thrust. Where the gear ratio $\gamma cvt$ is changed to the target gear ratio $\gamma cvttgt$ by changing the thrust applied to the primary pulley 60, the gear-ratio changing thrust $\Delta W$ is represented by a primary gear-ratio changing thrust $\Delta Win$ that corresponds to an amount by which the thrust applied to the primary pulley 60 is increased or reduced. Where the gear ratio $\gamma cvt$ is changed to the target gear ratio $\gamma cvttgt$ by changing the thrust applied to the secondary pulley 64, the gear-ratio changing thrust $\Delta W$ is represented by a secondary gear-ratio changing thrust $\Delta Wout$ that corresponds to an amount by which the thrust applied to the secondary pulley 64 is increased or reduced.

Where one of the primary-side shifting-control thrust Winsh and secondary-side shifting-control thrust Woutsh, which are thrusts required to be applied to the respective primary and secondary pulleys 60, 64 in a shifting control, has been set, the other of the primary-side shifting-control thrust Winsh and secondary-side shifting-control thrust Woutsh is set to a sum of the balance thrust Wbl and the gear-ratio changing thrust $\Delta W$, wherein the balance thrust Wbl is dependent on the above-described one of the primary-side shifting-control thrust Winsh and secondary-side shifting-control thrust Woutsh and the thrust ratio $\tau$ corresponding to the target gear ratio $\gamma cvttgt$, and the gear-ratio changing thrust $\Delta W$ corresponds to the target shifting speed $d\gamma tgt$ of change of the target gear ratio $\gamma cvttgt$. The target shifting speed $d\gamma tgt$ is represented by a primary target shifting speed $d\gamma intgt$ and a secondary target shifting speed $d\gamma outtgt$. The primary gear-ratio changing thrust $\Delta Win$ is a positive value ($\Delta Win>0$) that is larger than zero in a shift-up state in which the gear ratio $\gamma cvt$ is to be reduced, and is a negative value ($\Delta Win<0$) that is smaller than zero in a shift-down state in which the gear ratio $\gamma cvt$ is to be increased. The primary gear-ratio changing thrust $\Delta Win$ is zero ($\Delta Win=0$) in a steady state in which the gear ratio $\gamma cvt$ is constant. Further, the secondary gear-ratio changing thrust $\Delta Wout$ is a negative value ($\Delta Wout<0$) that is smaller than zero in the shift-up state, and is a positive value ($\Delta Wout>0$)

that is larger than zero in the shift-down state. The secondary gear-ratio changing thrust ΔWout is zero (ΔWout=0) in the steady state.

Figure 3:
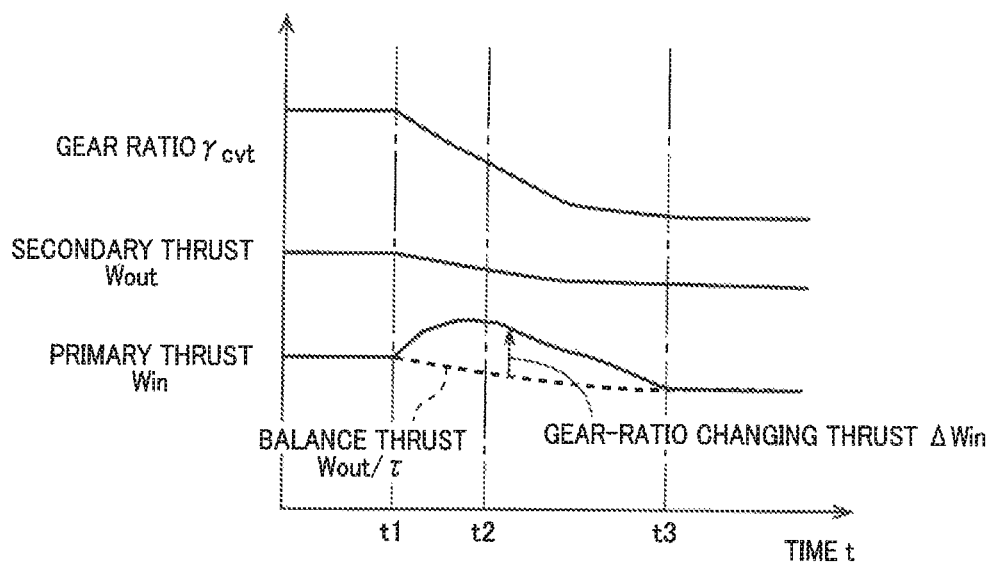
FIG. 3 is a view showing an example for explaining thrusts required for a shifting control.
Figure 4:
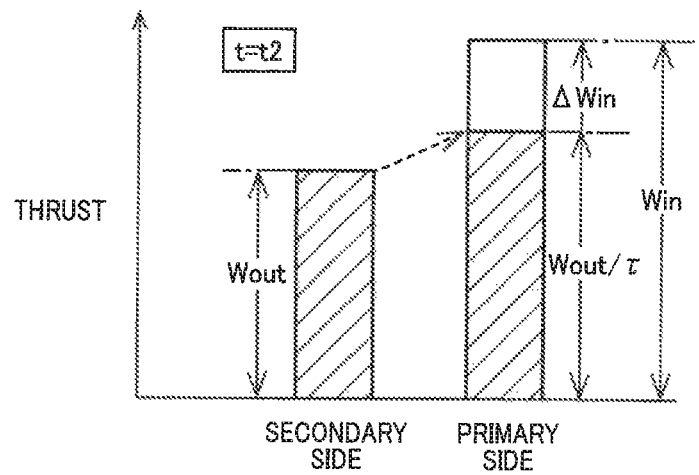
FIG. 4 is a view showing, by way of example, a relationship between the thrusts at a point t2 of time shown in FIG. 3.

FIG. 3 is a view showing an example for explaining thrusts required for a shifting control. FIG. 4 is a view showing, by way of example, a relationship between the thrusts at a point t2 of time shown in FIG. 3. FIGS. 3 and 4 show, by a way of example, the primary thrust Win that is set in a case where a desired shift-up action is executed by increasing the primary thrust Win while setting the secondary thrust Wout to prevent a belt slippage on the secondary pulley 64. As shown in FIG. 3, in a stage until a point t1 of time and a stage from a point t3 of time, namely, in the steady state in which the target gear ratio γcvttgt is constant with the primary gear-ratio changing thrust ΔWin is zero, the primary thrust Win consists of only the primary balance thrust Winbl (=Wout/τ). In a stage from the point t1 of time until the point t3 of time, namely, in the shift-up state in which the target gear ratio γcvttgt is reduced, the primary thrust Win corresponds to a sum of the primary balance thrust Winbl and the primary gear-ratio changing thrust ΔWin, as shown in FIG. 4. In FIG. 4, a hatched portion of each of the primary and secondary thrusts Win, Wout corresponds to a corresponding one of the primary and secondary balance thrusts Winbl, Woutbl that are required at the point t2 of time shown in FIG. 3 to maintain the target gear ratio γcvttgt.

Figure 5:
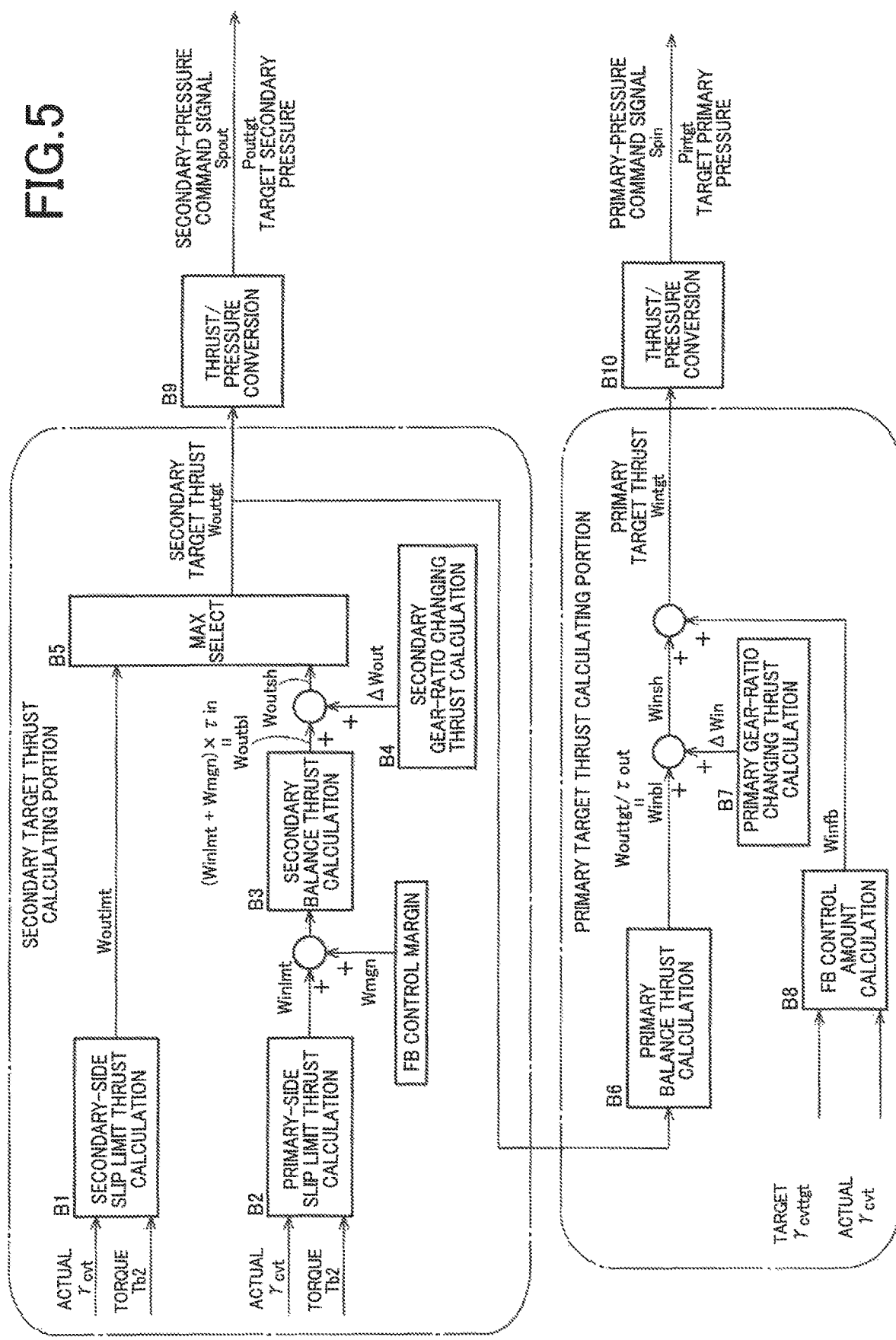
FIG. 5 is a block diagram showing an arrangement for controls performed to prevent a belt slippage and establish a target gear ratio, with minimally required thrusts.

FIG. 5 is a block diagram showing an arrangement for control operations performed to prevent a belt slippage and execute a desired shifting action, with minimally required thrusts. This block diagram is for explaining a hydraulic control, i.e., CVT hydraulic control executed in the continuously-variable transmission mechanism 24.

In FIG. 5, the transmission-shifting control portion 94 calculates the target gear ratio γcvttgt. Specifically, the transmission-shifting control portion 94 calculates the target primary rotational speed Npritgt by applying the accelerator operation amount θacc and the vehicle running speed V into a predetermined relationship in the form of a CVT shifting map. Then, the transmission-shifting control portion 94 calculates, based on the target primary rotational speed Npritgt, a post-shifting target gear ratio γcvttgtl (=Npritgt/Nsec) that is the gear ratio γcvt to be established after the shifting action executed in the continuously-variable transmission mechanism 24. In order that the shifting action is executed rapidly and smoothly, the transmission-shifting control portion 94 determines the target gear ratio γcvttgt as a transient target value of the gear ratio γcvt in process of the shifting action, based on a pre-shifting gear ratio γcvt (i.e., gear ratio γcvt before the shifting action) and the post-shifting target gear ratio γcvttgtl, according to a relationship predetermined to cause the shifting action to be executed rapidly and smoothly. For example, the transmission-shifting control portion 94 determines the target gear ratio γcvttgt (that is to be changed in process of the shifting action) as a function that is changed, along a curved line whose inclination is smoothly changed, toward the post-shifting target gear ratio γcvttgtl, with lapse of time from initiation of the shifting action. This smoothly curved line is, for example, a first-order lag curve or a second-order lag curve. When determining the target gear ratio γcvttgt, the shifting control portion 94 calculates the target shifting speed dγtgt, based on the target gear ratio γcvttgt as the time function. When the target gear ratio γcvttgt becomes constant upon completion of the shifting action, namely, when the continuously-variable transmission mechanism 24 is brought back into the steady state, the shifting speed dγtgt becomes zero.

The transmission-shifting control portion 94 calculates an input torque inputted to the continuously-variable transmission mechanism 24, which is to be used in calculations of the primary target thrust Wintgt and secondary target thrust Wouttgt. More precisely, the transmission-shifting control portion 94 calculates, as the input torque, a first input torque that is to be used in calculation of the thrust ratio τ for establishing the target gear ratio γcvttgt of the continuously-variable transmission mechanism 24 and a second input torque that is to be used in calculation of the primary-side slip limit thrust Winlmt and the secondary-side slip limit thrust Woutlmt. In the following description relating to the present embodiment, the first input torque will be referred to as a thrust-ratio-calculation input torque Tb1 and the second input torque will be referred to as a belt-slippage-prevention input torque Tb2.

Specifically, the transmission-shifting control portion 94 calculates an estimated value of the engine torque Te, for example, by applying the throttle opening degree tap and the engine rotational speed Ne to a predetermined relationship such as an engine torque map. The transmission-shifting control portion 94 calculates a turbine torque Tt, based on the estimated value of the engine torque Te and a predetermined relationship such as characteristic of the torque converter 20. The calculated turbine torque Ti is an estimated value of the input torque inputted to the continuously-variable transmission mechanism 24. The transmission-shifting control portion 94 handles or regards the turbine torque Tt as the thrust-ratio-calculation input torque Tb1.

Basically, the thrust-ratio-calculation input torque Tb1 may be handled as the belt-slippage-prevention input torque Tb2. However, in view of variation or the like, it is not preferable that the slip limit thrust Wlmt is set to zero when the thrust-ratio-calculation input torque Tb1 is zero. Therefore, as the belt-slippage-prevention input torque Tb2, a torque value, which is obtained through a lower-limit guard processing applied to an absolute value of the thrust-ratio-calculation input torque Tb1, is used. The transmission-shifting control portion 94 selects, as the belt-slippage-prevention input torque Tb2, a larger one of the absolute value of the thrust-ratio-calculation input torque Tb1 and a minimally required torque Tblim. The minimally required torque Tblim is a positive value that is predetermined as a lower limit value, for increasing the belt-slippage-prevention input torque Tb2 so as to more reliably prevent a belt slippage in view of a variation. It is noted that, when the thrust-ratio-calculation input torque Tb1 is a negative vale, a torque value dependent on the thrust-ratio-calculation input torque Tb1 may be used as the belt-slippage-prevention input torque Tb2, in view of a low torque accuracy (i.e., low accuracy of an obtained value of each torque). This torque value dependent on the thrust-ratio-calculation input torque Tb1 is, for example, a positive value that is larger than an absolute value of the thrust-ratio-calculation input torque Tb1. Thus, the belt-slippage-prevention input torque Tb2 is a torque value that is based on the thrust-ratio-calculation input torque Tb1.

At each of blocks B1 and B2 shown in FIG. 5, the transmission-shifting control portion 94 calculates the slip limit thrust Wlmt, based on the actual gear ratio γcvt and the belt-slippage-prevention input torque Tb2. Specifically, the transmission-shifting control portion 94 calculates the secondary-side slip limit thrust Woutlmt, by using equation (1) given below, and calculates the primary-side slip limit thrust Winlmt, by using equation (2). In the equations (1) and (2), "Tb2" represents the belt-slippage-prevention input torque Tb2; "τout" represents a torque (=γcvt*Tb2=(Rout/Rin)

*Tb2) that is obtained by multiplying the belt-slippage-prevention input torque Tb2 by the gear ratio γcvt; "α" represents a sheave angle of each of the pulleys 60, 64 (see FIG. 2), "μin" represents an element/pulley friction coefficient in the primary pulley 60 (i.e., friction coefficient between the transmission belt 66 and the primary pulley 60), "μout" represents an element/pulley friction coefficient in the secondary pulley 64 (i.e., friction coefficient between the transmission belt 66 and the secondary pulley 64), "Rin" represents 1/2 of the belt winding diameter (effective diameter) of the primary pulley 60, which is uniquely calculated based on the actual gear ratio γcvt (see FIG. 2), and "Rout" represents 1/2 of the belt winding diameter (effective diameter) of the secondary pulley 64, which is uniquely calculated based on the actual gear ratio γcvt (see FIG. 2)

$$Woutlmt = (Tout * \cos\alpha)/(2 * \mu out * Rout) \quad (1)$$
$$= (Tb2 * \cos\alpha)/(2 * \mu out * Rin)$$

$$Winlmt = (Tb2 * \cos\alpha)/(2 * \mu in * Rin) \quad (2)$$

As the slip limit thrust Wlmt, a value obtained through a lower-limit guard processing applied to the calculated slip limit thrust Wlmt may be used. The transmission-shifting control portion 94 selects, as the primary-side slip limit thrust Winlmt to be used at block B3 shown in FIG. 5, a larger one of the primary-side slip limit thrust Winlmt (that is calculated in the above equation (2)) and a primary-side minimum thrust Winmin. The primary-side minimum thrust Winmin is a hard limit minimum thrust which is to be applied to the primary pulley 60 and which includes a thrust generated as a control variation amount of the primary pressure Pin and a thrust generated by a centrifugal hydraulic pressure in the primary hydraulic actuator 60c. The control variation amount of the primary pressure Pin is a predetermined maximum value of the primary pressure Pin, which could be supplied from the hydraulic control unit 46 into the hydraulic actuator 60c even when the primary-pressure command signal Spin requesting the primary pressure Pin to be zero. Substantially the same description is applied to the secondary-side slip limit thrust Woutlmt as well.

At each of blocks B3 and B6 shown in FIG. 5, the transmission-shifting control portion 94 calculates the balance thrust Wbl. That is, the transmission-shifting control portion 94 calculates the secondary balance thrust Woutbl based on the primary-side slip limit thrust Winlmt, and calculates the primary balance thrust Winbl based on the secondary target thrust Wouttgt.

Figure 6:
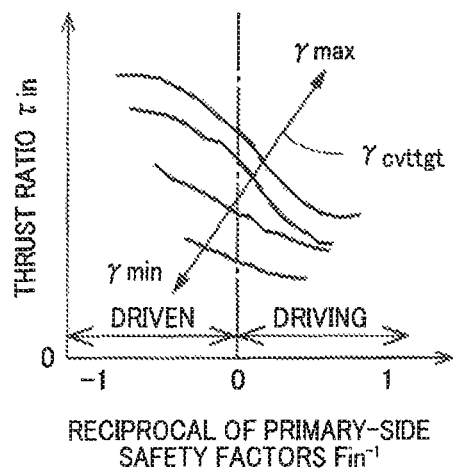
FIG. 6 is a view showing, by way of example, a thrust ratio map for calculating a thrust ratio, which is used to calculate the thrust to be applied to a secondary pulley.
Figure 7:
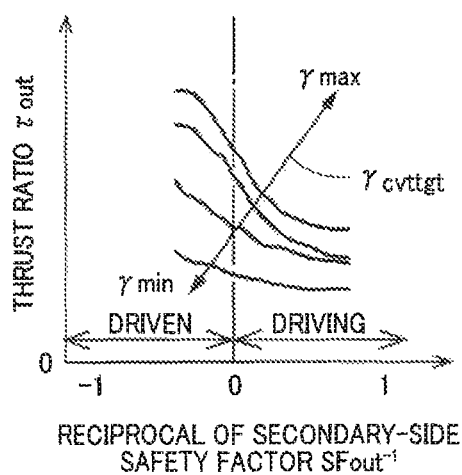
FIG. 7 is a view showing, by way of example, a thrust ratio map for calculating a thrust ratio, which is used to calculate the thrust to be applied to a primary pulley.

Specifically, the transmission-shifting control portion 94 calculates a thrust ratio τin that corresponds to or establishes the target gear ratio γcvttgt, for example, by applying the target gear ratio γcvttgt and a reciprocal SFin$^{-1}$ (=Winlmt/Win) of a primary-side safety factor SFin (=Win/Winlmt) to a thrust ratio map (τin) shown in FIG. 6. The thrust ratio map (τin) is a predetermined relationship between the reciprocal SFin$^{-1}$ of the primary-side safety factor SFin and the thrust ratio τin, with a parameter in the form of the target gear ratio γcvttgt. The thrust ratio τin is a secondary-thrust calculation thrust ratio that is used to calculate the thrust applied to the secondary pulley 64, based on the thrust applied, to the primary pulley 60. The transmission-shifting control portion 94 calculates the secondary balance thrust Woutbl based on the primary-side slip limit thrust Winlmt and the thrust ratio τin, by using equation (3) given below. The primary-side safety factor SFin is represented by, for example, "Win/Winlmt" or "Tb2/Tb1", and the reciprocal SFin$^{-1}$ of the primary-side safety factor SFin is represented by, for example, "Winlmt/Win" or "Tb1/Tb2". Further, the transmission-shifting control portion 94 calculates a thrust ratio τout that corresponds to or establishes the target gear ratio γcvttgt, for example, by applying the target gear ratio γcvttgt and a reciprocal. SFout$^{-1}$ (=Woutlmt/Wout) of a secondary-side safety factor SFout (=Wout/Woutlmt) to a thrust ratio map (τout) shown in FIG. 7. The thrust ratio map (τout) is a predetermined relationship between the reciprocal SFout$^{-1}$ of the secondary-side safety factor SFout and the thrust ratio τout, with a parameter in the form of the target gear ratio γcvttgt. The thrust ratio τout is a primary-thrust calculation thrust ratio that is used to calculate the thrust applied to the primary pulley 60, based on the thrust applied to the secondary pulley 64. The transmission-shifting control portion 94 calculates the primary balance thrust Winbl based on the secondary target thrust Wouttgt and the thrust ratio τout, by using equation (4) given below. The secondary-side safety factor SFout is represented by, for example, "Wout/Woutlmt" or "Tb2/Tb1", and the reciprocal SFout$^{-1}$ of the secondary-side safety factor SFout is represented by, for example, "Woutlmt/Wout" or "Tb1/Tb2". Since the belt-slippage-prevention input torque Tb2 is always a positive value, when the vehicle 10 is in a driving state (i.e., a state in which the vehicle 10 drives itself) in which the thrust-ratio-calculation input torque Tb1 is a positive value, a driving-state range of the thrust ratio τ is used, because each of the reciprocals SFin$^{-1}$, SFout$^{-1}$ of the respective safety factors SFin, SFout is also a positive value when the vehicle 10 is in the driving state. On the other hand, when the vehicle 10 is in a driven state in which the thrust-ratio-calculation input torque Tb1 is a negative value, a driven-state range of the thrust ratio τ is used, because each of the reciprocals SFin$^{-1}$, SFout$^{-1}$ of the respective safety factors SFin, SFout is also a negative value when the vehicle 10 is in the driven state. Each of the reciprocals SFin$^{-1}$, SFout$^{-1}$ may be calculated each time when the balance thrust Wbl is to be calculated. Or alternatively, where each of the safety factors SFin, SFout is set to a predetermined value (e.g., about 1.0-1.5), each of the reciprocals SFin$^{-1}$, SFout$^{-1}$ may be reciprocals of such safety factor set to the predetermined value.

$$Woutbl = Winlmt * \tau in \quad (3)$$

$$Winbl = Wouttgt/\tau out \quad (4)$$

As described above, each of the slip limit thrusts Winlmt, Woutlmt is calculated based on the belt-slippage-prevention input torque Tb2 that is based on the thrust-ratio-calculation input torque Tb1. The reciprocals SFin$^{-1}$, SFout$^{-1}$ of the respective safety factors SFin, SFout, based on which the thrust ratios τin, tout are calculated, are values based on the thrust-ratio-calculation input torque Tb1. Therefore, the transmission-shifting control portion 94 calculates, based on the thrust-ratio-calculation input torque Tb1, the thrust ratio τ that corresponds to or establishes the target gear ratio γcvttgt of the continuously-variable transmission mechanism 24.

At each of blocks B4 and B7 shown in FIG. 5, the transmission-shifting control portion 94 calculates the gear-ratio changing thrust ΔW. That is, the transmission-shifting control portion 94 calculates the secondary gear-ratio changing thrust ΔWout and the primary gear-ratio changing thrust ΔWin.

Figure 8:
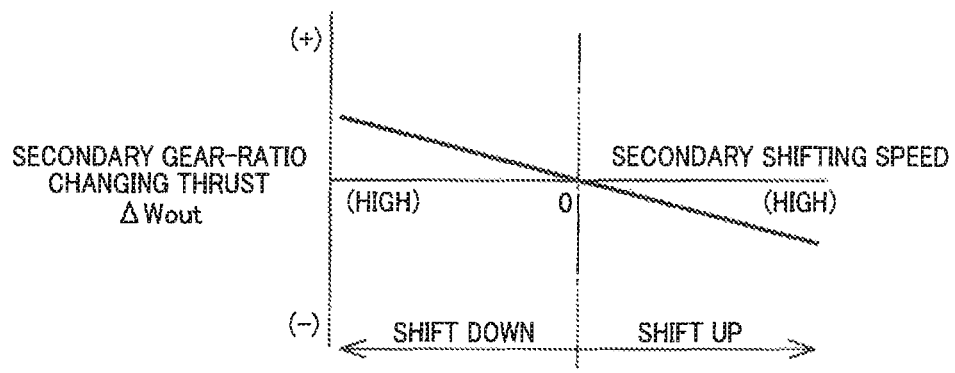
FIG. 8 is a view showing, by way of example, a gear-ratio-changing thrust map for calculating a secondary gear-ratio changing thrust.
Figure 9:
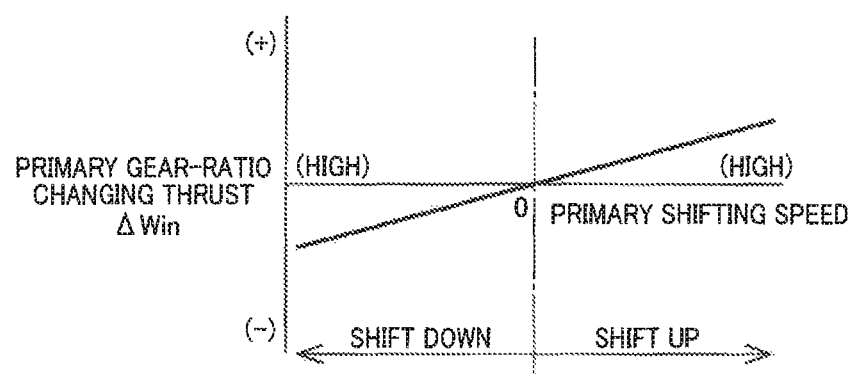
FIG. 9 is a view showing, by way of example, a gear-ratio-changing thrust map for calculating a primary gear-ratio changing thrust.

Specifically, the transmission-shifting control portion. 94 calculates the secondary gear-ratio changing thrust ΔWout, for example, by applying the secondary target shifting speed dγouttgt to a gear-ratio-changing thrust map (ΔWout) shown in FIG. 8. The gear-ratio-changing thrust map (ΔWout) represents, by way of example, a predetermined relationship between the secondary shifting speed dγout and the secondary gear-ratio changing thrust ΔWout. The transmission-shifting control portion 94 calculates, as the secondary thrust required to prevent a belt slippage on the primary pulley 60, a secondary-side shifting-control thrust Woutsh(=Woutbl+ΔWout), by adding the secondary gear-ratio changing thrust ΔWout to the secondary balance thrust Woutbl. Further, the transmission-shifting control portion 94 calculates the primary gear-ratio changing thrust ΔWin, for example, by applying the primary target shifting speed dγintgt to a gear-ratio-changing thrust map (ΔWin) shown in FIG. 9. The gear-ratio-changing thrust map (ΔWin) represents, by way of example, a predetermined relationship between the primary shifting speed dγin and the primary gear-ratio changing thrust ΔWin. The transmission-shifting control portion 94 calculates a primary-side shifting-control thrust Winsh (=Winbl+ΔWin), by adding the primary gear-ratio changing thrust ΔWin to the primary balance thrust Winbl.

In calculations made at the above-described blocks B3 and B4, a predetermined physical characteristic diagram such as the thrust ratio map (τin) shown in FIG. 6 and the gear-ratio-changing thrust map (ΔWout) shown in FIG. 8 is used. Therefore, in a result of calculation of each of the secondary balance thrust Woutbl and the secondary gear-ratio changing thrust ΔWout, there exists a variation that is dependent on an individual difference of a hard unit such as the hydraulic control unit 46 in terms of physical characteristics. Where such a variation in terms of the physical characteristics is taken into consideration, the shifting control portion 94 may add a control margin Wmgn to the primary-side slip limit thrust Winlmt. The control margin Wmgn is a predetermined thrust that corresponds to the variation in terms of the physical characteristics which could affect the calculation of each of the secondary balance thrust Woutbl and the secondary gear-ratio changing thrust ΔWout. Where the variation in terms of the physical characteristics is taken into consideration, the transmission-shifting control portion 94 calculates the secondary balance thrust Woutbl by using an equation "Woutbl=(Winlmt+Wmgn)*τin" shown in FIG. 5 in place of the above-described equation (3). It is noted that the calculation could be affected by the variation in terms of the physical characteristics as well as the variation in term of an actual value of the pulley hydraulic-pressure that is generated in response to the hydraulic-control command signal Scvt, and that the calculation could be affected by the variation in terms of the physical characteristics by a degree, which could be relatively large depending on a kind of hard unit (such as the hydraulic control unit 46) having the individual difference. However, in general, the degree by which the calculation could be affected by the variation in the physical characteristics is extremely small as compared with a degree by which the calculation could be affected by the variation in the actual value of the pulley hydraulic-pressure.

At block B5 shown in FIG. 5, the transmission-shifting control portion 94 selects, as the secondary target thrust Wouttgt, a larger one of the secondary-side slip limit thrust Woutlmt and the secondary-side shifting-control thrust Woutsh.

At block B8 shown in FIG. 5, the transmission-shifting control portion calculates a feedback control amount Winfb.

Specifically, the transmission-shifting control portion 94 calculates a feedback control amount (=FB control amount) Winfb that makes the actual gear ratio γcvt equal to the target gear ratio γcvttgt, by using a feedback-control formula in the form of equation (5) given below. In the equation (5), "Δγcvt" represents the gear ratio deviation Δγcvt, "Kp" represents a predetermined proportionality constant, "Ki" represents a predetermined integral constant, and "Kd" represents a predetermined differential constant. The transmission-shifting control portion 94 calculates, as the primary target thrust Wintgt, an amended value (=Winsh+Winfb) of the feedback control amount Winfb that is amended by a feedback control, by adding the feedback control amount Winfb to the primary-side shifting-control thrust Winsh.

$$Winfb = Kp*\Delta\gamma cvt + Ki*(\int \Delta\gamma cvt dt) + Kd*(d\Delta\gamma cvt/dt) \quad (5)$$

At each of blocks B9 and B10 shown in FIG. 5, the transmission-shifting control portion 94 converts the target thrust into a target pulley pressure. Specifically, the transmission-shifting control portion 94 converts the primary target thrust Wintgt into a target primary pressure Pintgt (=Wintgt/pressure receiving area), based on the pressure receiving area of the primary hydraulic actuator 60c, and converts the secondary target thrust Wouttgt into a target secondary pressure Pouttgt (=Wouttgt/pressure receiving area), based on the pressure receiving area of the secondary hydraulic actuator 64c. The transmission-shifting control portion 94 sets the primary-pressure command signal Spin representing the target primary pressure Pintgt and the secondary-pressure command signal Spout representing the target secondary pressure Pouttgt.

The transmission-shifting control portion 94 supplies the hydraulic-control command signal Scvt in the form of the primary-pressure command signal Spin and the secondary-pressure command signal Spout, to the hydraulic control unit 46, for thereby obtaining the target primary pressure Pintgt and the target secondary pressure Pouttgt. The hydraulic control unit 46 regulates the primary pressure Pin and the secondary pressure Pout, in accordance with the supplied hydraulic-control command signal Scvt.

In the drive-force transmitting apparatus 16, the operation state of the second clutch C2 is to be switched among a plurality of states depending on, for example, the running mode of the vehicle 10, wherein the plurality of states include at least four states consisting of a fully released state, a fully engaged state, a release process state and an engagement process state. For example, the second clutch C2 is placed in the fully engaged state during the belt running mode, and is placed in the fully released state during the gear running mode. Further, during execution of the C-to-C shifting control for switching the running mode between the gear running mode and the belt running mode, the second clutch C2 is temporarily placed in the release process state or the engagement process state. Moreover, during a garage shifting operation that is executed by operation of the shift lever 86 between the neutral position N and the drive position D in the belt running mode, too, the second clutch C2 is temporarily placed in the release process state or the engagement process state. The input torque inputted to the continuously-variable transmission mechanism 24 is changed with change of the operation state of the second clutch C2. That is, the input torque inputted to the continuously-variable transmission mechanism 24 is a torque value that is dependent on the operation state of the second clutch C2.

It is preferable to establish the target gear ratio γcvttgt of the continuously-variable transmission mechanism 24 while preventing a belt slippage in the continuously-variable transmission mechanism 24, not only in a belt-running-mode situation in which the vehicle 10 is running in the belt running mode, but also in other situations other than the belt-running-mode situation. To this end, the transmission-shifting control portion 94 calculates the input torque inputted to the continuously-variable transmission mechanism 24, which is used in calculation of the primary target thrust Wintgt and the secondary target thrust Wouttgt, depending on the operation state of the second clutch C2. That is, the transmission-shifting control portion 94 calculates the thrust-ratio-calculation input torque Tb1 and the belt-slippage-prevention input torque Tb2, depending on the operation state of the second clutch C2.

When the second clutch C2 is in the fully engaged state, the transmission-shifting control portion 94 handles or regards the turbine torque Tt as the thrust-ratio-calculation input torque Tb1, and handles or regards a larger one of the absolute value of the thrust-ratio-calculation input torque Tb1 and the minimally required torque Tblim as the belt-slippage-prevention input torque Tb2, as in a method of calculation of the primary target thrust Wintgt and secondary target thrust Wouttgt, which has been described above, by way of example, when the vehicle 10 is in the belt running mode.

When the second clutch C2 is in the fully released state, the transmission-shifting control portion 94 sets the thrust-ratio-calculation input torque Tb1 to zero, and handles or regards a converted value of a drag torque of the second clutch C2 converted on the primary shaft 58, i.e., on the input shaft 22, as the belt-slippage-prevention input torque Tb2. The drag torque of the second clutch C2 is, for example, a predetermined torque value when the second clutch C2 is in the fully released state.

When the second clutch C2 is in the engagement process state or in the release process state, the transmission-shifting control portion 94 handles or regards a converted value of a second clutch torque Tcitc2 converted on the primary shaft 58, i.e., on the input shaft 22, as the thrust-ratio-calculation input torque Tb1. When the second clutch C2 is in the engagement process state or the release process state, the transmission-shifting control portion 94 handles or regards a larger one of the thrust-ratio-calculation input torque Tb1 and the minimally required torque Tblitn, as the belt-slippage-prevention input torque Tb2, namely, handles or regards a converted value of the second clutch torque Tcltc2 converted on the input shaft 22 and taking account of the minimally required torque Tblim, as the belt-slippage-prevention input torque Tb2. The transmission-shifting control portion 94 calculates the second clutch torque Tcltc2, for example, by applying a C2 command pressure to a predetermined second clutch torque map. It is noted that, in the engagement process state or in the release process state of the second clutch C2, the minimally required torque Tblim may be set to a value that is either the same as or different from that in the fully engaged state of the second clutch C2.

Meanwhile, it is desirable that the target gear ratio γcvttgt is set to a value that is dependent on the running mode and the control state. During running of the vehicle 10 in the belt running mode, the transmission-shifting control portion 94 sets the target gear ratio γcvttgt of the continuously-variable transmission mechanism 24 to a value that is calculated with use of the CVT shifting map, as described above.

It is desirable that the stepped shift-up action of the drive-force transmitting apparatus 16 is executed with the actual gear ratio γcvt of the continuously-variable transmission mechanism 24 being the highest gear ratio γmax that is the closest to the gear ratio EL of the gear mechanism 28, so as to minimize the rotational speed difference of the second clutch C2 in the engagement process state of the second clutch C2, for thereby restraining the amount of heat generation in the second clutch C2. Thus, the transmission-shifting control portion 94 executes the stepped shift-up action of the drive-force transmitting apparatus 16 in a state in which the actual gear ratio γcvt of the continuously-variable transmission mechanism 24 is the highest gear ratio γmax. That is, the transmission-shifting control portion 94 allows the stepped shift-up action to be executed in the drive-force transmitting apparatus 16, in the state in which the actual gear ratio γcvt of the continuously-variable transmission mechanism 24 is the highest gear ratio γmax. Therefore, in the gear running mode, the transmission-shifting control portion 94 sets the target gear ratio γcvttgt of the continuously-variable transmission mechanism 24 to the highest gear ratio γmax, in preparation for the execution of the stepped shift-up action of the drive-force transmitting apparatus 16.

When the working fluid temperature THoil is low, it is desirable to not execute the C-to-C shifting control of the drive-force transmitting apparatus 16 such as the stepped shift-up action and stepped shift-down action, in view of the controllability. Thus, when the working fluid temperature THoil is low, for example, the transmission-shifting control portion 94 does not execute the C-to-C shifting control in the drive-force transmitting apparatus 16, so that the vehicle 10 is caused to run only in the belt running Mode. The transmission-shifting control portion 94 inhibits the gear running mode from being established, for example, when the working fluid temperature THoil is lower than a predetermined temperature value. Therefore, the vehicle 10 is caused to start running, normally, in the gear running mode, but is caused to start running in the belt running mode when the working fluid temperature THoil is lower than the predetermined temperature value. When the vehicle 10 is to start running in the belt running mode, it is desirable that the start of running of the vehicle 10 is made with the gear ratio γcvt of the continuously-variable transmission mechanism 24 being the highest gear ratio max, for assuring a high drive force performance. Therefore, when the vehicle 10 is to start running, for example, in the belt running mode, the transmission-shifting control portion 94 sets the target gear ratio γcvttgt of the continuously-variable transmission mechanism 24 to the highest gear ratio γmax.

By the way, when the target gear ratio γcvttgt of the continuously-variable transmission mechanism 24 is the highest gear ratio γmax, there is a case in which the actual gear ratio γcvt of the continuously-variable transmission mechanism 24 is not the highest gear ratio γmax, namely, in which a highest-gear-ratio-side return failure occurs. That is, when the transmission belt 66 requires to be returned to a position corresponding to the highest gear ratio γmax, there is a case in which the transmission belt 66 is not actually returned to the position corresponding to the highest gear ratio γmax, namely, in which a so called "belt return failure" occurs. For example, when the vehicle 10 is suddenly stopped, during running in the belt running mode, by a large braking operation made by the vehicle operator, there is a possibility that the vehicle 10 would be stopped without the actual gear ratio γcvt of the continuously-variable transmission mechanism 24 being changed to the highest gear ratio γmax, namely, there is a possibility that the belt return failure would occur. Further, when the flow rate of the working fluid supplied from the hydraulic control unit 46 becomes temporarily insufficient upon stopping of the vehicle 10, there is a possibility that a rate of change of the gear ratio γcvt of the continuously-variable transmission mechanism 24 would be reduced so that the belt return failure would occur. In the shifting control, the rate of change of the gear ratio γcvt of the continuously-variable transmission mechanism 24 corresponds to a time derivative of the gear ratio γcvt, i.e., a rate of change of the gear ratio γcvt with respect to time.

In the event of the belt return failure, it is desirable that the belt return failure is quickly cleared. In the event of the belt return failure, the actual gear ratio ycvt, which should be equal to the highest gear ratio γmax as the target gear ratio γcvttg, is deviated from the highest gear ratio γmax, so that the target primary pressure Pintgt could be reduced too much as a result of compensation of the primary target thrust Wintgt by the feedback control that is executed based on the gear ratio deviation Δγcvt at the block 138 shown in FIG. 5 as long as the target gear ratio γcvttgt is the highest gear ratio γmax. If the primary pressure Pin is reduced too much, there is a risk that a belt slippage occurs. In the present embodiment, in the event of the belt return failure, the transmission-shifting control portion 94 sets the target gear ratio γcvttgt to, in place of the highest gear ratio γmax, a belt-return target gear ratio γtgtb as a transient target gear ratio, which is gradually changed toward the highest gear ratio γmax, for causing the actual gear ratio γcvt to be gradually changed toward the highest gear ratio γmax.

In the following description regarding the present embodiment, the target gear ratio γcvttgt, which is set in a normal case without occurrence of the belt return failure, is referred to as a normal target gear ratio γtgtn. The normal target gear ratio γtgtn includes, for example, (i) the target gear ratio γcvttgt that is calculated with use of the CVT shifting map in the belt running mode, (ii) the highest gear ratio γmax to which the target gear ratio γtgtn is set in the gear running mode, and (iii) the highest gear ratio γmax to which the target gear ratio γtgtn is set upon running start of the vehicle 10, for example, in the belt running mode, as described above.

Figure 10:
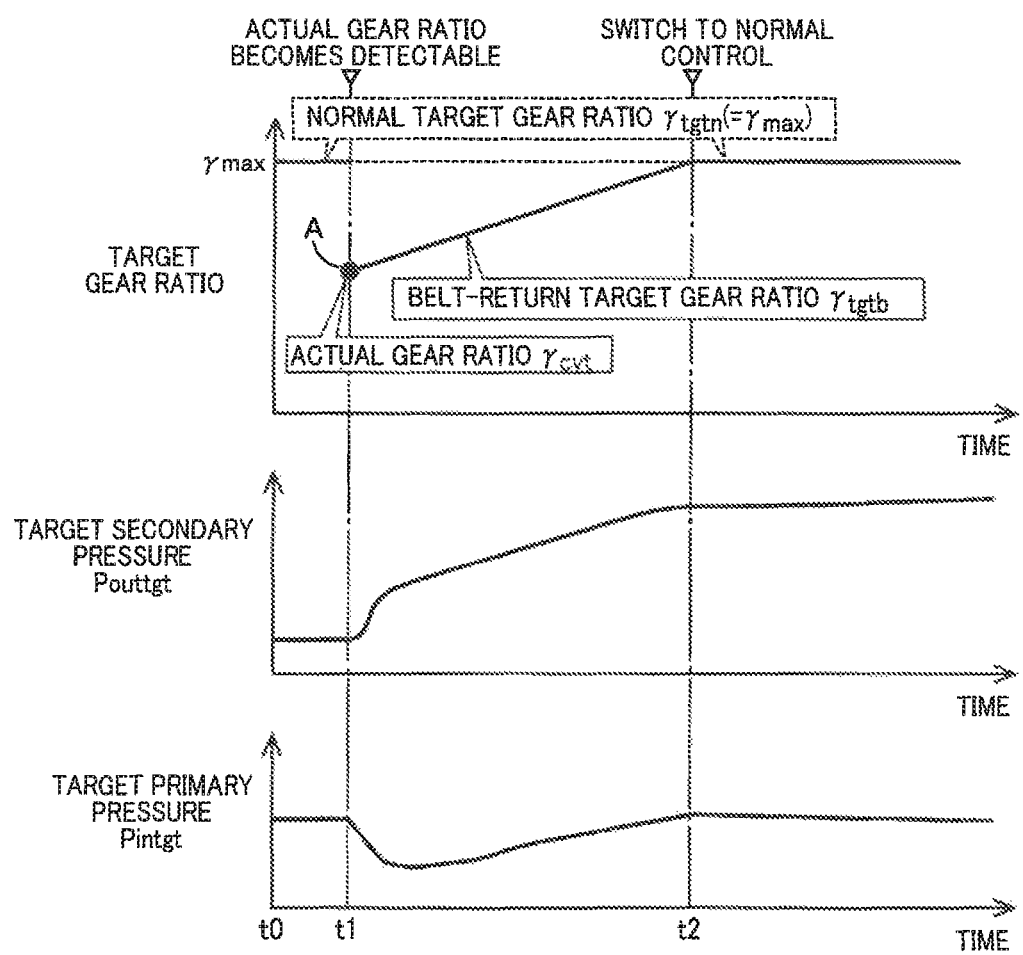
FIG. 10 is a view showing, by way of example, a belt-return target gear ratio that is set in the event of occurrence of a belt return failure when the vehicle is to start running in a belt running mode.

FIG. 10 is a view showing, by way of example, the belt-return target gear ratio γtgtb that is set in the event of occurrence of the belt return failure when the vehicle 10 is to start running in the belt running mode. In FIG. 10, a point t0 of time indicates a point of time at which the vehicle 10 starts running. The actual gear ratio γcvt (=Npri/Nsec) is not detected until the vehicle running speed V is increased to a certain speed level, because an accuracy of calculation of the actual gear ratio γcvt is not assured in an extremely low rotational speed region in which a detection accuracy of each of the primary and secondary speed sensors 72, 74 is not assured due to characteristics of each of the speed sensors 72, 74 (see a stage from the point t0 of time to a point t1 of time in FIG. 10). In a stage until the actual gear ratio γcvt becomes detectable, the target gear ratio γcvttgt is set to the highest gear ratio γmax as the normal target gear ratio γtgtn, so that the target primary pressure Pintgt and the target secondary pressure Pouttgt are set to pressure values that correspond to the respective primary balance thrust Winbl and secondary balance thrust Woutbl, which cooperate with each other to maintain the highest gear ratio γmax, by executions of the controls shown in the block diagram of FIG. 5. In a stage from the point t1 of time to a point t2 of time at which the actual gear ratio γcvt has become detectable, the target gear ratio γcvttgt is set to the belt-return target gear ratio γtgtb that is changed to connect between the actual gear ratio γcvt (indicated by black circle A) at the point t1 of time and the highest gear ratio γmax. A belt return rate Δγtgtb (=dγtgtb/dt), which a rate of change of the belt-return target gear ratio γtgtb, is, for example, a predetermined speed value that makes it possible to rapidly clear the belt return failure While preventing occurrence of the belt slippage. In the stage from the point ti of time to the point t2 of time, the target primary pressure Pintgt and the target secondary pressure Pouttgt are calculated with the target gear ratio γcvttgt being set to the belt-return target gear ratio γtgtb, by executions of the controls shown in the block diagram of FIG. 5. In a stage from the point t2 of time at which the belt-return target gear ratio γtgtb has reached the highest gear ratio γmax, the target gear ratio γcvttgt is set again to the normal target gear ratio γtgtn, and the target primary pressure Pintgt and the target secondary pressure Pouttgt are calculated by executions of the controls shown in the block diagram of FIG. 5. That is, at the point t2 of time, a belt return control for clearing the belt return failure is completed and is switched to a normal control. In the belt running mode, the target gear ratio γcvttgt is calculated as the normal target gear ratio γtgtn in the stage from the point t2 of time, with use of the the CVT shifting map, and the target gear ratio γcvttgt is set to the highest gear ratio γmax at beginning of the stage from the point t2 of time.

The belt-return target gear ratio γtgtb is set also when the belt return failure occurs in the gear running mode. Unlike the gear running mode in which the second clutch C2 is fully released, in the belt running mode in which the second clutch. C2 is fully engaged, the thrust-ratio-calculation input torque Tb1 is not zero, so that there is concern of insufficiency of the belt torque capacity Tcvt relative to the thrust-ratio-calculation input torque Tb1 if the belt return rate Δγtgtb is set to a high rate value to rapidly reduce the primary pressure Pin. The belt return rate Δγtgtb in the belt running mode, which has been described with reference to FIG. 10, is set to a rate value that avoids such insufficiency of the belt torque capacity Tcvt. However, in the gear running mode, if the belt return rate Δγtgtb is set to the same speed value as in the belt running mode, the execution of the stepped shift-up action, which is allowed when the actual gear ratio γcvt becomes equal to the highest gear ratio γmax, could be delayed. From a different point of view, there is a possibility that the actual gear ratio γcvt could not become equal to the highest gear ratio γmax by a point of time at which it is determined that the stepped shift-up action is to be executed in the drive-force transmitting apparatus 16. In the gear miming mode in which the thrust-ratio-calculation input torque Tb1 is made zero, it is considered that the belt slippage is unlikely to be caused even if the belt return rate Δγtgtb is made higher than in the belt running mode.

Figure 11:
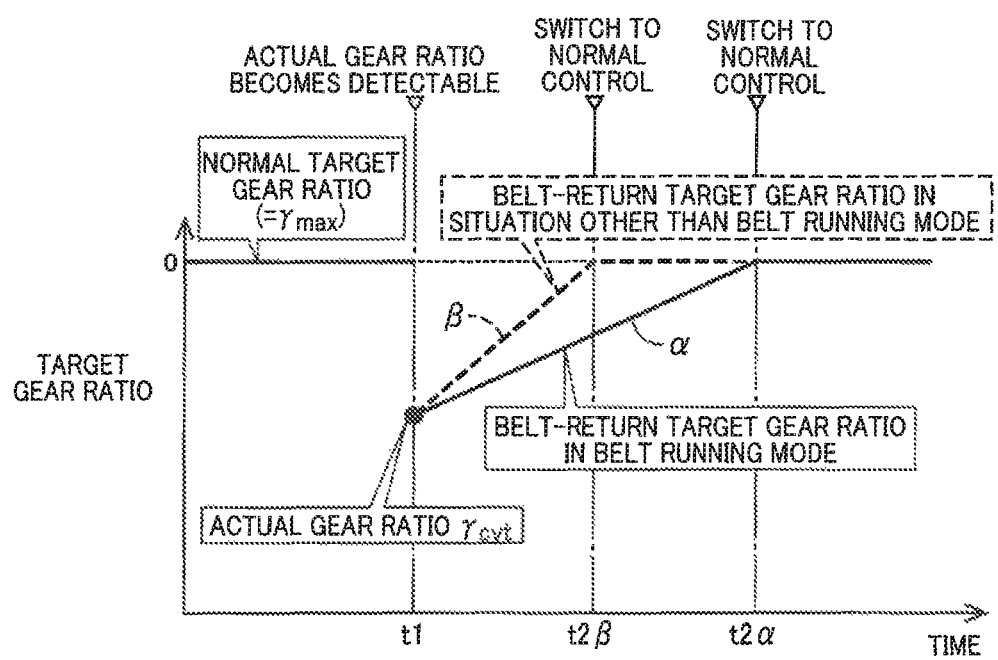
FIG. 11 is a view showing, by way of example, a belt-return target gear ratio that is set in the event of occurrence of the belt return failure when the vehicle is to start running in a situation other than the belt-running-mode situation, in comparison with the belt-return target gear ratio shown in FIG. 10, which is set when the vehicle is to start running in the belt running mode.

FIG. 11 is a view showing, by way of example, the belt-return target gear ratio γtgtb that is set in the event of occurrence of the belt return failure when the vehicle 10 is to start running in a situation other than the belt-running-mode situation, in comparison with the belt-return target gear ratio γtgtb shown in FIG. 10, which is set when the vehicle 10 is to start running in the belt running mode. In FIG. 11, solid line a represents the belt-return target gear ratio γtgtb which is used in the belt running mode and which is the same as the belt-return target gear ratio γtgtb shown in FIG. 10. Broke line β represents the belt-return target gear ratio γtgtb which is used in the situation other than the belt running mode situation and which is higher in the belt return rate Δγtgtb than the belt-return target gear ratio γtgtb represented by solid line α. That is, the belt return rate Δγtgtb in the situation other than the belt running mode situation is higher than the belt return rate Δγtgtb in the belt running mode. When the second clutch C2 is in a state other than the fully engaged state, namely, when the second clutch C2 is in the fully released state, release process state or engagement process state, the thrust-ratio-calculation input torque Tb1 is made smaller than when the second clutch C2 is in the fully engaged state. In view of this, the belt return rate $\Delta\gamma tgtb$ is made higher in the release process state and engagement process state of the second clutch C2 as well as in the gear running mode, as compared with in the belt running mode. Therefore, the broken line β shown in FIG. 11 represents the belt-return target gear ratio γtgtb that is used in the other situation which is other than the belt running mode situation and which includes not only in the gear running mode situation but also situations of the release process state and engagement process state of the second clutch C2. The belt return rate $\Delta\gamma tgtb$ in the situation other than the belt running mode situation is, for example, a predetermined rate value that is made higher than that in the belt running mode situation, by an amount corresponding to the reduction of the thrust-ratio-calculation input torque Tb1 in the situation other than the belt running mode situation.

For realizing control function of setting the belt-return target gear ratio γtgtb to a ratio value that is dependent on the running mode, the electronic control apparatus 90 further includes a state determining means or portion in the form of a state determining portion 96.

The state determining portion 96 makes a determination as to whether the highest-gear-ratio-side return failure occurs, namely, whether the belt return failure occurs. The state determining portion 96 makes this determination based on whether the gear ratio deviation $\Delta\gamma cvt$ (=γmax−γcvt) of the actual gear ratio γcvt from the highest gear ratio γmax as the target gear ratio γcvttgt exceeds a given deviation value A or not. As described above, there is a case in which the actual gear ratio γcvt is not detectable due to characteristics of the primary and secondary speed sensors 72, 74. The state determining portion 96 stores the latest ratio value of the actual gear ratio γcvt detected in a state in which the actual gear ratio γcvt is detectable, and makes the above determination regarding occurrence of the belt return failure, by using the stored latest value of the actual gear ratio γcvt, when the actual gear ratio γcvt is not detectable, until the actual gear ratio γcvt becomes detectable. The given deviation value A is, for example, a predetermined threshold value for determining occurrence of the belt return failure. From different point of view, the given deviation value A is, for example, a predetermined threshold value of the gear ratio deviation $\Delta\gamma cvt$ that makes a determination that there is a risk of the belt slippage if the target gear ratio γcvttgt is set to the highest gear ratio γmax.

The state determining portion 96 makes a determination as to whether the actual gear ratio γcvt is detectable, by determining whether the primary rotational speed Npri is at least a given speed value A and the secondary rotational value Nsec is at least a given speed value B. Each of the given speed values A, B is a predetermined threshold value that is minimally required to assure accuracy of detection of a corresponding one of the primary and secondary rotational values Npri, Nsec.

The state determining portion 96 makes a determination as to whether the belt-return target gear ratio γtgtb becomes substantially equal to the highest gear ratio γmax. The state determining portion 96 makes this determination, depending on whether a deviation (=γmax−γtgtb) of the belt-return target gear ratio γtgtb from the highest gear ratio γmax is equal to or less than a given deviation value B. This given deviation value B is, for example, a predetermined threshold value for determining that the belt-return target gear ratio γtgtb has become close to the highest gear ratio γmax by such a degree that makes it possible to judge that the belt-return target gear ratio γtgtb has become equal to the highest gear ratio γmax.

When it is determined by the state determining portion 96 that the belt return failure occurs, the transmission-shifting control portion 94 calculates a target pulley pressure as each of the target primary pressure Pintgt and target secondary pressure Pouttgt corresponding to the primary balance thrust Winbl and secondary balance thrust Woutbl that cooperate with each other to maintain the highest gear ratio γmax, by using the controls shown in the block diagram of FIG. 5, for example, until it is determined by the state determining portion 96 that the actual gear ratio γcvt has become detectable.

When it is determined by the state determining portion 96 that the belt return failure occur and the actual gear ratio γcvt is detectable, the transmission-shifting control portion 94 sets the target gear ratio γcvttgt to the belt-return target gear ratio γtgtb that is linearly increased to the highest gear ratio γmax from the actual gear ratio γcvt at a point of time at which the actual gear ratio γcvt has become detectable. In each of FIGS. 10 and 11, the belt-return target gear ratio γtgtb is represented by a straight line connecting between the actual gear ratio γcvt (at the point of time at which the actual gear ratio γcvt has become detectable) and the highest gear ratio γmax. Thus, when it is determined by the state determining portion 96 that the belt return failure occurs, the transmission-shifting control portion 94 sets the target gear ratio γcvttgt to the belt-return target gear ratio γtgtb in place of the highest gear ratio γmax.

When setting the target gear ratio γcvagt to the belt-return target gear ratio γtgtb, the transmission-shifting control portion 94 makes the belt return rate $\Delta\gamma tgtb$ higher in the gear running mode than in the belt running mode. When setting the target gear ratio γcvagt to the belt-return target gear ratio γtgtb, the transmission-shifting control portion 94 makes the belt return rate $\Delta\gamma tgtb$ higher in a transition state of switching of the operation state of the second clutch C2 between the fully engaged state and the fully released state, namely, in the engagement process state or release process state of the second clutch C, as compared with in the belt running mode. That is, when setting the target gear ratio γcvttgt to the belt-return target gear ratio γtgtb, the transmission-shifting control portion 94 makes the belt return rate $\Delta\gamma tgtb$ higher in the situation other than the belt-running-mode situation than in the belt-running-mode situation. This belt return rate $\Delta\gamma tgtb$ corresponds to the target shifting speed dγtgt.

Figure 14:
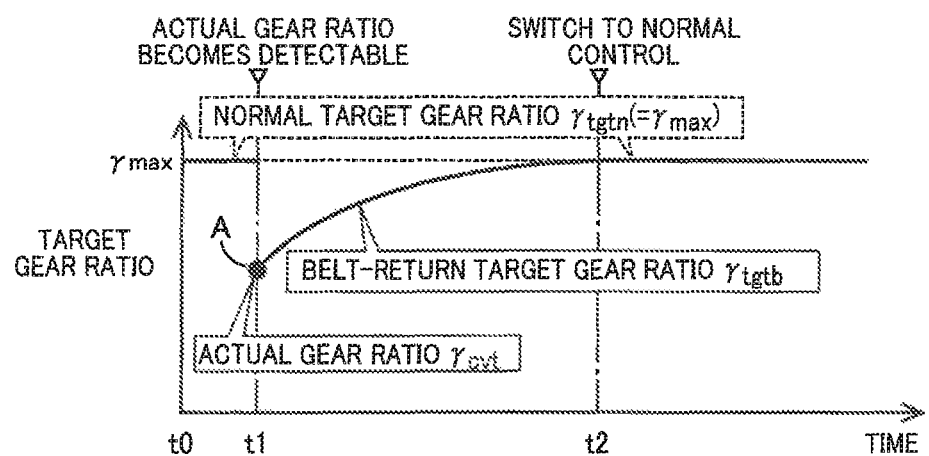
FIG. 14 is a view showing a modification arrangement in which a rate of change of the belt-return target gear ratio is made lower when a difference between an actual gear ratio and a highest gear ratio of the continuously-variable transmission mechanism becomes small, than when the difference is still large.

It is noted that, when setting the target gear ratio γcvttgt to the belt-return target gear ratio γtgtb, the transmission-shifting control portion 94 may make the belt return rate $\Delta\gamma tgtb$ lower when a difference (=γmax−γcvt) between the actual gear ratio γcvt and the highest gear ratio γmax becomes small, than when the difference is still large, a shown in FIG. 14. That is, when setting the target gear ratio γcvttgt to the belt-return target gear ratio γtgtb, the transmission-shifting control portion 94 may reduce the belt return rate $\Delta\gamma tgtb$ when the actual gear ratio γcvt becomes close to the highest gear ratio γmax.

It is noted that, when setting the target gear ratio γcvttgt to the belt-return target gear ratio γtgtb in the gear running mode, the transmission-shifting control portion 94 may make the belt return rate $\Delta\gamma tgtb$ higher as the secondary rotational speed Nsec is higher. In this case, the secondary rotational speed Nsec may be, for example, a speed value at a point of time at which the target gear ratio γcvttgt starts to be set to the belt-return target gear ratio γtgtb. The belt-return target gear ratio γtgtb is set to a value dependent on the secondary rotational speed Nsec. The lower the actual gear ratio γcvt is, the higher the secondary rotational speed Nsec is. When the actual gear ratio γcvt is low, the belt return rate Δγtgtb requires to be high so as to cause the actual gear ratio γcvt to become equal to the highest gear ratio γmax in substantially the same length of time as when the actual gear ratio γcvt is low.

The transmission-shifting control portion 94 calculates the target primary pressure Pintgt and the target secondary pressure Pouttgt, on the basis of the belt-return target gear ratio γtgtb, for example, in the controls shown in the block diagram of FIG. 5. In the controls shown in the block diagram of FIG. 5, the blocks B1 through 137 are implemented by feed-forward control (=FF control), and the block B8 is implemented by feed-back control (=FB control). Thus, the transmission-shifting control portion 94 executes the FF control and FB control shown, by way of examples, in the block diagram of FIG. 5, on the basis of the belt-return target gear ratio γtgtb.

When it is determined by the state determining portion 96 that the belt-return target gear ratio γtgtb has become substantially equal to the highest gear ratio γmax, the transmission-shifting control portion 94 starts the FF control and FB control shown, by way of examples, in the block diagram of FIG. 5, on the basis of the normal target gear ratio γtgtn. In the belt running mode, the normal target gear ratio γtgtn is initially set to the highest gear ratio γmax. In the gear running mode, the normal target gear ratio γtgtn is set to the highest gear ratio γmax.

Figure 12:
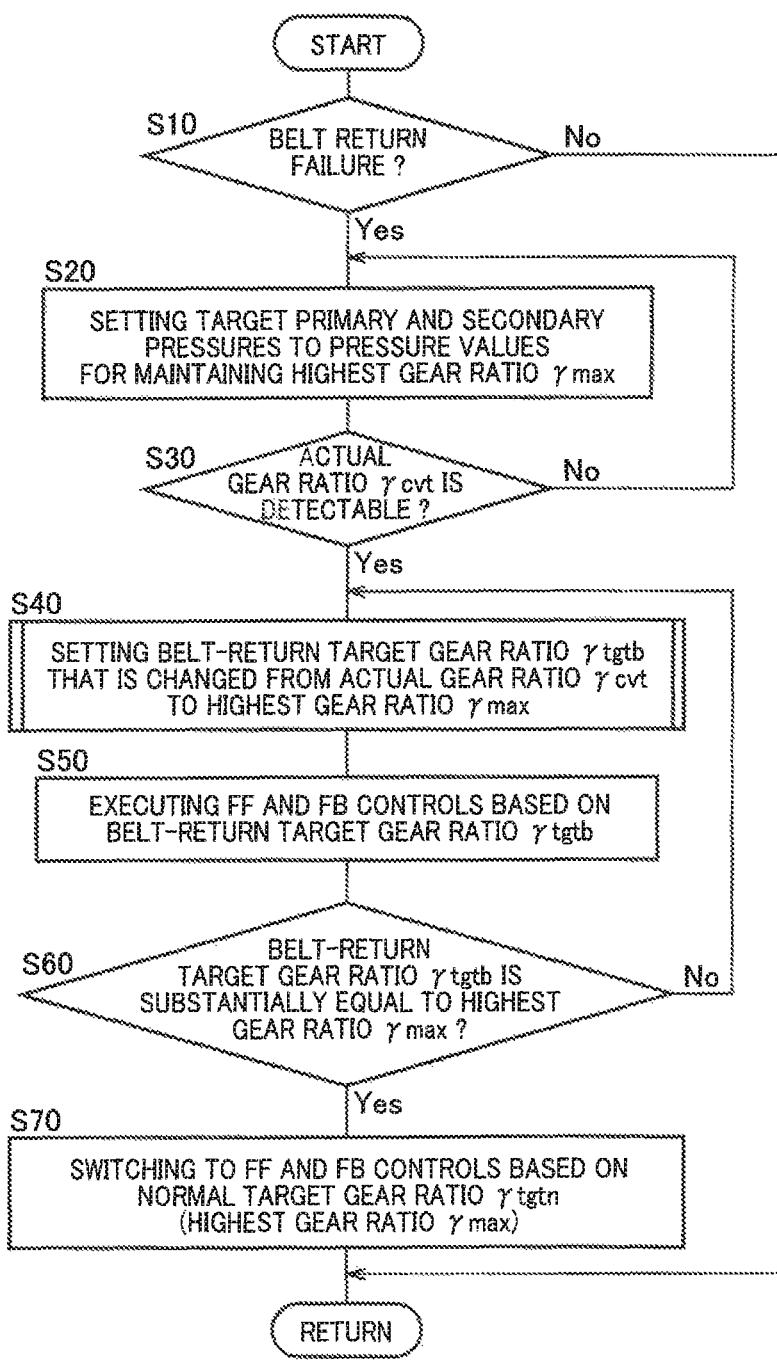
FIG. 12 is a flow chart showing a main part of a control routine executed by the control apparatus, namely, a control routine that is executed, in the event of occurrence of the belt return failure upon execution of a stepped shift-up action in the drive-force transmitting apparatus, for quickly clearing the belt return failure in view of a heat generation of a second clutch and also for preventing or reducing the belt slippage in the continuously-variable transmission mechanism.
Figure 13:
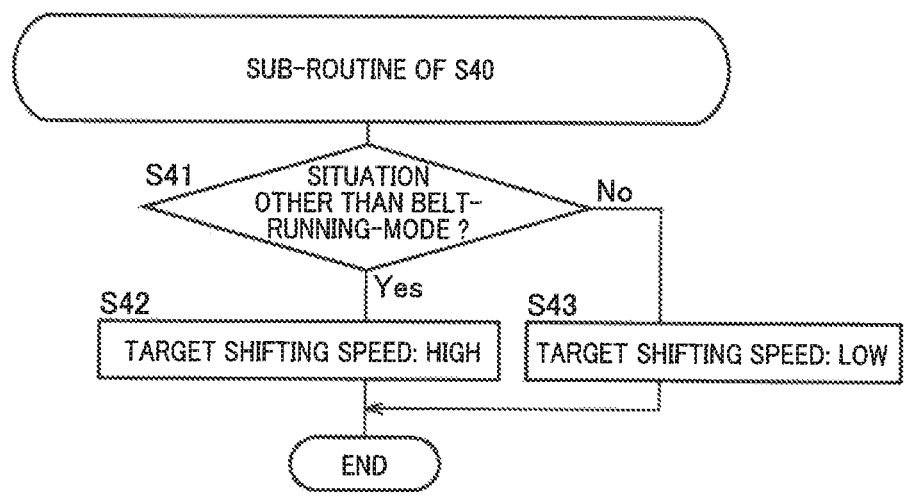
FIG. 13 is a flow chart showing a main part of a control routine executed by the control apparatus, namely, a control routine that is executed as a sub-routine corresponding to step S40 of the control routine shown in the flow chart of FIG. 12, for setting the belt-return target gear ratio.

FIG. 12 is a flow chart showing a main part of a control routine executed by the electronic control apparatus 90, namely, a control routine that is executed, in the event of occurrence of the belt return failure upon execution of the stepped shift-up action in the drive-force transmitting apparatus 16, for quickly clearing the belt return failure in view of a heat generation of the second clutch C2 and also for preventing or reducing the belt slippage in the continuously-variable transmission mechanism 24. This control routine is executed, for example, in a repeated manner. FIG. 13 is a flow chart showing a main part of a control routine executed by the electronic control apparatus 90, namely, a control routine that is executed as a sub-routine corresponding to step S40 of the control routine shown in the flow chart of FIG. 12, for setting the belt-return target gear ratio γtgtb.

As shown in FIGS. 12 and 13, the control routine is initiated with step S10 corresponding to function of the state determining portion 96, which is implemented to determine whether the belt return failure occurs. When a negative determination is made at step S10, one cycle of execution of the control routine is completed. When an affirmative determination is made at step S10, step S20 corresponding to function of the transmission-shifting control portion 94 is implemented to set the target primary pressure Pintgt and the target secondary pressure Pouttgt to respective target pulley pressure values that cooperate with each other to maintain the highest gear ratio γmax. Step S20 is followed by step S30 corresponding to function of the state determining portion 96, which is implemented to determine whether the actual gear ratio γcvt is detectable. When a negative determination is made at step S30, the control flow goes back to step S20. When an affirmative determination is made at step S30, step S40 corresponding to function of the transmission-shifting control portion 94 is implemented to set the target gear ratio γcvttgt to the belt-return target gear ratio γtgtb that is linearly increased to the highest gear ratio γmax from the actual gear ratio γcvt at the point of time at which it was determined at step S30 that the actual gear ratio γcvt has become detectable. Specifically, as shown in FIG. 13, it is determined whether the current situation corresponds to the situation other than the belt-running-mode situation at step S41. When an affirmative determination is made at step S41, step S42 is implemented to set the belt return rate Δγtgt, b, i.e., the target shifting speed dγtgt to a relatively high rate value, i.e., a relative high speed value. When a negative determination is made at step S41, step S43 is implemented to set the belt return rate Δγtgtb, i.e., the target shifting speed dγtgt to a relatively low rate value, i.e., a relative low speed value. Then referring back to FIG. 12, step S50 corresponding to function of the transmission-shifting control portion 94 is implemented to execute the FF control and FB control on the basis of the belt-return target gear ratio γtgtb, for example, such that the thrust ratio Wout/Win is controlled based on the gear ratio deviation Δγcvt of the actual gear ratio γcvt from the transient target gear ratio γtgtb as the target gear ratio γcvagt, in a manner that reduces the gear ratio deviation Δγcvt. Step S50 is followed by step S60 corresponding to function of the state determining portion 96, which is implemented to determine whether the belt-return target gear ratio γtgtb is substantially equal to the highest gear ratio γmax. When a negative determination is made at step S60, the control flow goes back to step S40. When an affirmative determination is made at step S60, step S70 corresponding to function of the transmission-shifting control portion 94 is implemented to switch to the the FF control and FB control executed on the basis of the normal target gear ratio γtgtn.

As described above, in the present embodiment, when the belt return failure occurs, the target gear ratio γcvagt of the continuously-variable transmission mechanism 24 is set to the belt-return target gear ratio γtgtb rather than to the highest gear ratio γmax, wherein the belt-return target gear ratio γtgtb is changed toward the highest gear ratio γmax, for causing the actual gear ratio γcvt to be changed toward the highest gear ratio γmax. Thus, in the event of occurrence of the belt return failure, the actual gear ratio γcvt is changed to the highest gear ratio γmax in an appropriate manner. Further, when the target gear ratio γcvagt is set to the belt-return target gear ratio γtgtb, the belt return rate Δγtgtb is made higher in the gear running mode than in the belt running mode, so that the belt return failure is quickly cleared in the gear running mode. In the gear running mode in which the input torque inputted to the continuously-variable transmission mechanism 24 is made relatively small, the belt slippage is likely to be prevented or reduced even if the belt return rate Δγtgtb is made relatively high. On the other hand, in the belt running mode in which the input torque inputted to the continuously-variable transmission mechanism 24 is made relatively large, the belt return rate Δγtgtb is made relatively low so that the belt slippage is likely to be prevented or reduced. Therefore, in the event of occurrence of the belt return failure, it is possible to quickly clear the belt return failure to restrain heat generation of the second clutch C2 upon execution of a stepped shift-up action of the drive-force transmitting apparatus 16, and also preventing or reducing the belt slippage of the drive-force transmitting apparatus 16.

In the present embodiment, in the case in which the target gear ratio γcvttgt is set to the belt-return target gear ratio γtgtb, the belt return rate Δγtgtb is made lower when the difference between the actual gear ratio γcvt and the highest gear ratio γmax becomes small, than when the difference is still large. Thus, the actual gear ratio γcvt is made gradually and smoothly close to the highest gear ratio γmax.

In the present embodiment, in the case in which the target gear ratio γcvttgt is set to the belt-return target gear ratio γtgtb, the belt return rate Δγtgtb is made higher as the secondary rotational speed Nsec is higher in the gear running mode. Thus, in the gear running mode, the belt return failure is more quickly cleared.

In the present embodiment, the drive-force transmitting apparatus 16 is switched from the gear running mode to the belt running mode, in a state in which the actual gear ratio γcvt is the highest gear ratio γmax. Thus, with the belt return failure being quickly cleared in the gear running mode, it is possible to appropriately become ready for the stepped shift-up action of the drive-force transmitting apparatus 16.

In the present embodiment, in the gear running mode, the target gear ratio γcvttgt of the continuously-variable transmission mechanism 24 is set to the highest gear ratio γmax, so that it is possible to become ready for the stepped shift-up action of the drive-force transmitting apparatus 16.

In the present embodiment, when the vehicle 10 is to start running, the target gear ratio γcvttgt of the continuously-variable transmission mechanism 24 is set to the highest gear ratio γmax, so that it is possible to easily assure a high drive force performance when the vehicle 10 starts running even in the belt running mode.

In the present embodiment, when the target gear ratio γcvttgt of the continuously-variable transmission mechanism 24 is set to the belt-return target gear ratio γtgtb, the belt return rate Δγtgtb is made higher in the engagement process state or the release process state than in the belt running mode. Thus, the belt return failure is quickly cleared in the transient state of switching of the operation state of the second clutch C2. In the transient state of switching of the operation state of the second clutch C2, the input torque inputted to the continuously-variable transmission mechanism 24 is made relatively small, so that the belt slippage is unlikely to be caused even if the belt return rate Δγtgtb is made relatively high.

While the preferred embodiment of this invention has been described in detail by reference to the drawings, it is to be understood that the invention may be otherwise embodied.

For example, in the above-described embodiment, in view of the fact that the thrust-ratio-calculation input torque Tb1 is smaller in the release process state and engagement process state of the second clutch C2 than in the filly engaged state of the second clutch C2, the belt return rate Δγtgtb is made higher in the release process state and engagement process state of the second clutch C2 as well as in the gear running mode in which the second clutch C2 is fully engaged, than in the belt running mode. That is, the situation other than the belt running mode situation corresponds to the fully released state, release process state or engagement process state of the second clutch C2. However, for example, in view of the fact that the thrust-ratio-calculation input torque Tb1 is larger in the release process state and engagement process state of the second clutch C2 than in the fully released state of the second clutch C2, the belt return rate Δγtgtb may be made lower in the release process state and engagement process state of the second clutch C2 as well as in the fully engaged state of the second clutch C2, than in the gear running mode. In this modified arrangement, the belt-return target gear ratio γtgtb, which is represented by broken line β, is used only when the second clutch C2 is in the fully released state, while the belt-return target gear ratio γtgtb, which is represented by solid line α, is used not only when the second clutch C2 is in the fully engaged state but also when the second clutch C2 is in the release process state or in the engagement process state. Further, in the control routine shown in FIG. 13, an affirmative determination is made at step S41 in the gear running mode, while a negative determination is made at step S41 not only in the belt running mode but also in the release process state and engagement process state of the second clutch C2. In this modified arrangement, in the transient state of switching of the operation state of the second clutch C2, the belt slippage is easily prevented or reduced although the input torque inputted to the continuously-variable transmission mechanism 24 is made larger than in the gear running mode.

Further, the belt return rate Δγtgtb in the release process state and the engagement process state does not necessarily have to be the same value as the belt return rate Δγtgtb in the, gear running mode or the belt return rate Δγtgtb in the belt running mode. For example, the belt return rate Δγtgtb in the release process state and the engagement process state may be a value intermediate between the belt return rate Δγtgtb in the gear running mode and the belt return rate Δγtgtb in the belt running mode.

In the above-described embodiment, the second clutch C2 is provided in the drive-force transmitting path section (that corresponds to a part of the above-described second drive-force transmitting path PT2) between the secondary pulley 64 and the output shaft 30. However, for example, the second clutch C2 may be provided in another drive-force transmitting path section (that corresponds to another part of the second drive-force transmitting path PT2) between the primary pulley 60 and the input shaft 22. In this modified arrangement, the secondary shaft 62 and the output shaft 30 are integrally connected to each other, while the primary shaft 58 and the input shaft 22 through the second clutch C2. In this modified arrangement, too, the belt return rate Δγtgtb may be made higher as the secondary rotational speed Nsec is higher in the gear running mode.

In the above-described embodiment, the gear mechanism 28 is a gear mechanism which provides a single gear ratio that is higher than the highest gear ratio γmax of the continuously-variable transmission mechanism 24. However, the gear mechanism 28 may be, for example, a gear mechanism which provides a plurality of different gear ratios. That is, the gear mechanism 28 may be a gear mechanism in which a shifting action is to be executed from one of two or more gear positions to the other. Further, the gear mechanism 28 may be a gear mechanism that provides a gear ratio that is lower than the lowest gear ratio γmin of the continuously-variable transmission mechanism 24 and another gear ratio that is higher than the highest gear ratio γmax of the continuously-variable transmission mechanism 24.

In the above-described embodiment, the running mode of the drive-force transmitting apparatus 16 is switched between the gear running mode and the belt running mode, by using the shifting map in which the shift-up lines and shift-down lines are defined. However, the running mode of the drive-force transmitting apparatus 16 may be switched by setting a gear ratio satisfying the target drive force Fwtgt that is calculated based on the running speed V and the accelerator operation amount θacc.

In the above-described embodiment, the torque converter 20 is used as fluid-operated drive-force transmitting device. However, in place of the torque converter 20, any one of other types of fluid-operated drive-force transmitting devices such as a fluid coupling, which do not have a torque boosting function, may be used, for example. Further, the fluid-operated drive-force transmitting device does not have to be necessarily provided. In the above-described embodiment, the dog clutch D1 is provided in the first drive-force transmitting path PT1 through which the drive force is to be transmitted by the gear mechanism, 28. However, the provision of the dog clutch D1 is not essential for carrying out the invention.

It is to be understood that the embodiment described above is given for illustrative purpose only, and that the present invention may be embodied with various modifications and improvements which may occur to those skilled in the art.

NOMENCLATURE OF ELEMENTS

12: engine (drive force source)
14: drive wheels
16: vehicle drive-force transmitting apparatus
22: input shaft (input rotary member)
24: continuously-variable transmission mechanism
28: gear mechanism
30: output shaft (output rotary member)
60: primary pulley
64: secondary pulley
66: transmission belt (transfer element)
90: electronic control apparatus (control apparatus)
94: transmission-shifting control portion
96: state determining portion
B1: first brake (first engagement device)
C1: first clutch (first engagement device)
C2: second clutch (second engagement device)
PT1: first drive-force transmitting path
PT2: second drive-force transmitting path

What is claimed is:

1. A control apparatus for a drive-force transmitting apparatus that is to be provided in a vehicle having a drive force source and drive wheels,
  wherein the drive-force transmitting apparatus includes:
    an input rotary member to which a drive force is to be transmitted from the drive force source;
    an output rotary member from which the drive force is to be outputted to the drive wheels;
    a gear mechanism configured to provide at least one gear ratio;
    a continuously-variable transmission mechanism including a primary pulley, a secondary pulley, and a transfer element that is looped over the primary and secondary pulleys, and configured to provide a variable gear ratio that is lower than at least one of the at least one gear ratio provided by the gear mechanism; and
    first and second engagement devices,
  wherein the drive-force transmitting apparatus defines a plurality of drive-force transmitting paths that are provided in parallel with each other between the input rotary member and the output rotary member such that the drive force is to be transmitted from the input rotary member to the output rotary member through the drive-force transmitting paths,
  wherein the plurality of drive-force transmitting paths include a first drive-force transmitting path that is to be established by engagement of the first engagement device, such that the drive force is to be transmitted by the gear mechanism through the first drive-force transmitting path in a first state of the drive-force transmitting apparatus in which the first drive-force transmitting path is established,
  wherein the plurality of drive-force transmitting paths include a second drive-force transmitting path that is to be established by engagement of the second engagement device, such that the drive force is to be transmitted by the continuously-variable transmission mechanism through the second drive-force transmitting path in a second state of the drive-force transmitting apparatus in which the second drive-force transmitting path is established,
  wherein said control apparatus comprises a state determining portion configured, when a target gear ratio of the continuously-variable transmission mechanism is set to a highest gear ratio of the continuously-variable transmission mechanism, to determine whether the continuously-variable transmission mechanism is in a failure state in which the an actual gear ratio of the continuously-variable transmission mechanism is not the highest gear ratio,
  wherein said control apparatus comprises a transmission-shifting control portion configured, when said state determining portion determines that the continuously-variable transmission mechanism is in the failure state, to set the target gear ratio to a transient target gear ratio that is changed toward the highest gear ratio, for causing the actual gear ratio to be changed toward the highest gear ratio, and
  wherein said transmission-shifting control portion is configured to make a rate of change of the transient target gear ratio higher in the first state of the drive-force transmitting apparatus than in the second state of the drive-force transmitting apparatus.

2. The control apparatus according to claim 1, wherein said transmission-shifting control portion is configured, when setting the target gear ratio to the transient target gear ratio, to make the rate of the change of the transient target gear ratio lower when a difference between the actual gear ratio and the highest gear ratio becomes less than a first predetermined amount, than when the difference is still more than the first predetermined amount.

3. The control apparatus according to claim 1,
  wherein the second drive-force transmitting path includes a drive-force transmitting path section that is located between the secondary pulley and the output rotary member,
  wherein the second engagement device is disposed in the drive-force transmitting path section, and
  wherein said transmission-shifting control portion is configured, when setting the target gear ratio to the transient target gear ratio in the first state, to make the rate of the change of the transient target gear ratio higher as a rotational speed of the secondary pulley is higher.

4. The control apparatus according to claim 1, wherein said transmission-shifting control portion is configured to switch the drive-force transmitting apparatus from the first state to the second state, with the actual gear ratio being the highest gear ratio.

5. The control apparatus according to claim 1, wherein said transmission-shifting control portion is configured, in the first state of the drive-force transmitting apparatus, to set the target gear ratio of the continuously-variable transmission mechanism to the highest gear ratio.

6. The control apparatus according to claim 1, wherein said transmission-shifting control portion is configured, when the vehicle is to start running, to set the target gear ratio of the continuously-variable transmission mechanism to the highest gear ratio.

7. The control apparatus according to claim 1, wherein said transmission-shifting control portion is configured, when setting the target gear ratio of the continuously-variable transmission mechanism to the transient target gear ratio, to make the rate of change of the transient target gear ratio higher in a transient state of switching of an operation state of the second engagement device between a fully engaged state and a fully released state than in the second state.

8. The control apparatus according to claim 1, wherein said transmission-shifting control portion is configured, when setting the target gear ratio of the continuously-variable transmission mechanism to the transient target gear ratio, to make the rate of change of the transient target gear ratio lower in a transient state of switching of an operation state of the second engagement device between a fully engaged state and a fully released state than in the first state.

9. The control apparatus according to claim 1,
wherein the continuously-variable transmission mechanism further includes a primary thrust applier configured to apply a primary thrust to the primary pulley, and a secondary thrust applier configured to apply a secondary thrust to the second primary pulley, such that the transfer element is to be clamped based on the primary thrust by the primary pulley and is to be clamped based on the secondary thrust by the secondary pulley, and such that the variable gear ratio of the continuously-variable transmission mechanism is increased with increase of a thrust ratio that is a ratio of the secondary thrust to the primary thrust, and is reduced with reduction of the thrust ratio, and wherein said transmission-shifting control portion is configured, when setting the target gear ratio of the continuously-variable transmission mechanism to the transient target gear ratio, to control the thrust ratio, based on a deviation of the actual gear ratio from the transient target gear ratio as the target gear ratio, such that the deviation is reduced.

\* \* \* \* \*